United States Patent
Long et al.

(10) Patent No.: US 10,038,349 B2
(45) Date of Patent: Jul. 31, 2018

(54) MULTI-PHASE MODULAR COIL ELEMENT FOR ELECTRIC MOTOR AND GENERATOR

(71) Applicant: MILLENNIAL RESEARCH CORPORATION, Mounds, OK (US)

(72) Inventors: J. D. Long, Tulsa, OK (US); Michael J. McDaniels, Hutto, TX (US); Kevin H. Mosley, Simi Valley, CA (US); Denis Palmer, Tulsa, OK (US); Ed Butler, Tulsa, OK (US)

(73) Assignee: MILLENNIAL RESEARCH CORPORATION, Mounds, OK (US)

( * ) Notice: Subject to any disclaimer, the term of this patent is extended or adjusted under 35 U.S.C. 154(b) by 593 days.

(21) Appl. No.: 13/871,729

(22) Filed: Apr. 26, 2013

(65) Prior Publication Data

US 2013/0342054 A1 Dec. 26, 2013

Related U.S. Application Data

(60) Continuation-in-part of application No. 13/601,543, filed on Aug. 31, 2012, now Pat. No. 9,800,111,
(Continued)

(51) Int. Cl.
*H02K 3/52* (2006.01)
*H02K 1/27* (2006.01)
(Continued)

(52) U.S. Cl.
CPC ............ *H02K 3/521* (2013.01); *H02K 1/02* (2013.01); *H02K 1/08* (2013.01); *H02K 1/2793* (2013.01);
(Continued)

(58) Field of Classification Search
CPC ............ H02K 1/182; H02K 3/46; H02K 3/47; H02K 11/0047; H02K 11/0052;
(Continued)

(56) References Cited

U.S. PATENT DOCUMENTS 3,401,926 A * 9/1968 Wendelken .......... B65H 45/103
270/30.13
3,441,761 A 4/1969 Painton et al.
(Continued)

FOREIGN PATENT DOCUMENTS

CN 87206678 U 6/1988
CN 1073306 A 6/1993
(Continued)

OTHER PUBLICATIONS

Authorized officer Blaine R. Copenheaver, International Search Report and Written Opinion in Application No. PCT/US2009/054049 dated Sep. 24, 2009, 13 pages.
(Continued)

*Primary Examiner* — Quyen Leung
*Assistant Examiner* — Eric Johnson
(74) *Attorney, Agent, or Firm* — Lando & Anastasi, LLP

(57) ABSTRACT

Aspects and embodiments disclosed herein include a highly efficient electric motor which can be embodied in several configurations, including a standard motor, a hub motor, a linear motor, or other motor configuration. In one example, there is provided a motor comprising a rotor including a plurality of magnets and a stator including at least one coil module, the at least one coil module including a plurality of coils of conductive material, the plurality of coils arranged horizontally displaced from one another and retained in a matrix material of the at least one coil module.

37 Claims, 25 Drawing Sheets

Related U.S. Application Data which is a division of application No. 12/542,412, filed on Aug. 17, 2009.

(60) Provisional application No. 61/188,994, filed on Aug. 15, 2008.

(51) Int. Cl.

| | |
|---|---|
| *H02K 11/00* | (2016.01) |
| *H02K 3/50* | (2006.01) |
| *H02K 21/24* | (2006.01) |
| *H02K 3/04* | (2006.01) |
| *H02K 3/47* | (2006.01) |
| *H02K 16/00* | (2006.01) |
| *H02K 47/20* | (2006.01) |
| *H02K 1/02* | (2006.01) |
| *H02K 1/08* | (2006.01) |
| *H02K 3/18* | (2006.01) |
| *H02K 3/26* | (2006.01) |
| *H02K 11/04* | (2016.01) |
| *H02K 11/25* | (2016.01) |
| *H02K 5/22* | (2006.01) |
| *H02K 7/116* | (2006.01) |

(52) U.S. Cl.
CPC ............... *H02K 3/04* (2013.01); *H02K 3/18* (2013.01); *H02K 3/26* (2013.01); *H02K 3/47* (2013.01); *H02K 3/50* (2013.01); *H02K 11/0094* (2013.01); *H02K 11/046* (2013.01); *H02K 11/25* (2016.01); *H02K 16/00* (2013.01); *H02K 21/24* (2013.01); *H02K 47/20* (2013.01); *H02K 5/225* (2013.01); *H02K 7/116* (2013.01); *H02K 2213/12* (2013.01)

(58) Field of Classification Search
CPC .. H02K 11/0057; H02K 11/046; H02K 11/04; H02K 11/0094; H02K 16/00; H02K 21/24; H02K 47/02; H02K 47/0418; H02K 47/20; H02K 2213/06; H02K 2213/12; H02K 11/28; H02K 11/049; H02K 11/00; H02K 21/48; H02K 23/645; H02K 1/02; H02K 1/08; H02K 1/2793; H02K 3/04; H02K 3/18; H02K 3/26; H02K 3/50; H02K 11/25; H02K 11/0097; H02K 11/47; H02K 11/50
USPC ......... 310/43, 44, 68 R, 68 D, 68 C, 71, 208
See application file for complete search history.

(56) References Cited

U.S. PATENT DOCUMENTS

| | | | |
|---|---|---|---|
| 3,482,131 A * | 12/1969 | Lytle ..................... | H02K 3/04 310/156.37 |
| 3,679,953 A | 7/1972 | Bedford | |
| 4,211,963 A | 7/1980 | Muller | |
| 4,322,666 A | 3/1982 | Muller | |
| 4,340,833 A | 7/1982 | Sudo et al. | |
| 4,358,693 A | 11/1982 | Palmer et al. | |
| 4,634,958 A | 1/1987 | Cornwell | |
| 4,883,981 A | 11/1989 | Gerfast | |
| 5,184,040 A | 2/1993 | Lim | |
| 5,227,702 A | 7/1993 | Nahirney | |
| 5,514,923 A | 5/1996 | Gossler et al. | |
| 5,619,087 A * | 4/1997 | Sakai ..................... | H02K 1/12 310/156.36 |
| 5,723,933 A | 3/1998 | Grundl et al. | |
| 5,744,895 A | 4/1998 | Seguchi et al. | |
| 5,744,896 A | 4/1998 | Kessinger, Jr. et al. | |
| 5,760,507 A * | 6/1998 | Miller .................... | F02B 63/04 310/153 |
| 5,783,894 A | 7/1998 | Wither | |
| 5,786,645 A | 7/1998 | Obidniak | |
| 5,945,766 A | 8/1999 | Kim et al. | |
| 5,949,613 A | 9/1999 | Moir et al. | |
| 5,955,807 A | 9/1999 | Kajiura et al. | |
| 6,011,339 A | 1/2000 | Kawakami | |
| 6,081,056 A * | 6/2000 | Takagi .................. | H02K 5/08 310/216.137 |
| 6,155,364 A | 12/2000 | Nagano et al. | |
| 6,255,756 B1 | 7/2001 | Richter | |
| 6,531,799 B1 | 3/2003 | Miller | |
| 6,545,444 B2 | 4/2003 | Bedini | |
| 6,555,944 B1 | 4/2003 | York | |
| 6,590,312 B1 | 7/2003 | Seguchi et al. | |
| 6,600,244 B2 | 7/2003 | Okazaki et al. | |
| 6,803,696 B2 | 10/2004 | Chen | |
| 6,833,646 B2 | 12/2004 | Joong et al. | |
| 6,841,916 B2 | 1/2005 | Chiarenza | |
| 6,948,461 B1 | 9/2005 | Kotwicki | |
| 7,109,671 B2 | 9/2006 | Bedini | |
| 7,126,309 B1 | 10/2006 | Takeuchi et al. | |
| 7,187,098 B2 | 3/2007 | Hasebe et al. | |
| 7,202,620 B2 | 4/2007 | Petersen | |
| 7,298,063 B2 | 11/2007 | Cunningham | |
| 7,719,147 B2 | 5/2010 | Palmer, Jr. et al. | |
| 7,906,925 B2 | 3/2011 | Takeuchi | |
| 8,373,319 B1 * | 2/2013 | Barnes .................. | H02K 21/14 310/112 |
| 2003/0057796 A1 | 3/2003 | Fan et al. | |
| 2003/0193264 A1 * | 10/2003 | Pyntikov ............... | H02K 1/141 310/254.1 |
| 2004/0124796 A1 * | 7/2004 | Bailey ................... | H02K 1/141 318/400.4 |
| 2005/0012475 A1 | 1/2005 | Takeuchi | |
| 2005/0045392 A1 | 3/2005 | Maslov et al. | |
| 2005/0140244 A1 | 6/2005 | Yamada et al. | |
| 2005/0179337 A1 | 8/2005 | Hasebe et al. | |
| 2006/0169061 A1 | 8/2006 | Seffernick et al. | |
| 2006/0219447 A1 | 10/2006 | Saitou et al. | |
| 2006/0220491 A1 | 10/2006 | Takeuchi | |
| 2006/0244320 A1 | 11/2006 | Guo et al. | |
| 2006/0284507 A1 | 12/2006 | Murakami | |
| 2007/0052314 A1 | 3/2007 | Hsu | |
| 2007/0252472 A1 * | 11/2007 | Osada .................. | H02K 21/24 310/268 |
| 2007/0290582 A1 | 12/2007 | Han et al. | |
| 2008/0024044 A1 | 1/2008 | Palmer et al. | |
| 2008/0088200 A1 | 4/2008 | Ritchey | |
| 2008/0119314 A1 | 5/2008 | Usoro | |
| 2008/0136282 A1 | 6/2008 | Okazaki et al. | |
| 2008/0231132 A1 * | 9/2008 | Minowa ................ | H02K 16/00 310/114 |
| 2008/0278020 A1 | 11/2008 | Ley et al. | |
| 2009/0189561 A1 | 7/2009 | Patel et al. | |
| 2009/0278481 A1 | 11/2009 | Palmer | |
| 2010/0084938 A1 | 4/2010 | Palmer et al. | |
| 2010/0085005 A1 | 4/2010 | Palmer et al. | |
| 2010/0148611 A1 * | 6/2010 | Wang .................... | H02K 1/14 310/156.37 |
| 2010/0176685 A1 * | 7/2010 | Berdut-Teruel ....... | H02K 1/24 310/219 |
| 2010/0187931 A1 | 7/2010 | Palmer, Jr. et al. | |
| 2010/0253173 A1 * | 10/2010 | Miyata .................. | H02K 3/47 310/208 |
| 2011/0025067 A1 * | 2/2011 | Cipriani ................ | H02K 7/1823 290/52 |
| 2011/0080065 A1 * | 4/2011 | Watanabe ............. | H01F 41/0293 310/156.32 |
| 2011/0115327 A1 | 5/2011 | Pan | |
| 2012/0169063 A1 * | 7/2012 | Stegmann ............. | H02K 3/47 290/55 |
| 2012/0235530 A1 | 9/2012 | Moya et al. | |
| 2012/0326541 A1 | 12/2012 | Palmer et al. | |
| 2015/0369216 A1 * | 12/2015 | Kisovec ................ | F03D 3/068 290/44 |

(56) References Cited

U.S. PATENT DOCUMENTS

FOREIGN PATENT DOCUMENTS

| | | | | | |
|---|---|---|---|---|---|
| CN | 1160943 | A | 10/1997 | | |
| CN | 1215241 | A | 4/1999 | | |
| CN | 2854905 | Y | 1/2007 | | |
| EP | 1870990 | A2 | 12/2007 | | |
| JP | 49149911 | U | 12/1974 | | |
| JP | 54041406 | Y2 | 12/1979 | | |
| JP | 59183180 | A | 10/1984 | | |
| JP | 5199793 | A | 8/1993 | | |
| JP | 5219788 | | 8/1993 | | |
| JP | 2000197386 | A | 7/2000 | | |
| JP | 2000209894 | A | 7/2000 | | |
| JP | 2002034214 | A | 1/2002 | | |
| WO | WO 2004057738 | A1 * | 7/2004 | ............. | H02K 21/24 |
| WO | 2006068042 | A1 | 6/2006 | | |
| WO | 2007140624 | A1 | 12/2007 | | |
| WO | 2008007510 | A2 | 1/2008 | | |
| WO | WO 2011031686 | A1 * | 3/2011 | ............. | H02K 1/148 |
| WO | WO 2011077421 | A2 * | 6/2011 | ............. | H02K 1/182 |

OTHER PUBLICATIONS

Authorized officer Blaine R. Copenheaver, International Search Report and Written Opinion in Application No. PCT/US2009/054082 dated Aug. 17, 2009, 13 pages.

Authorized officer Brian Sircus, International Preliminary Report on Patentability in Application No. PCT/US2009/054049 dated Feb. 9, 2012, 10 pages.

Authorized officer Hanh Nguyen, International Search Report in Application No. PCT/US2007/73165 dated Aug. 22, 2008, 2 pages.

Authorized officer Horacio Ramos, International Search Report and Written Opinion in Application No. PCT/US2009/043042 dated May 7, 2010, 13 pages.

Authorized officer Lee Young, International Preliminary Report on Patentability in Application No. PCT/US2009/054082 dated Oct. 21, 2010, 10 pages.

International Search Report and Written Opinion from International Application No. PCT/US14/35548 dated Mar. 16, 2015.

* cited by examiner

| Ratio of Magnets to Coils | Phase |
|---|---|
| 1.077 | 13 |
| 1.083 | 12 |
| 1.100 | 10 |
| 1.111 | 9 |
| 1.129 | 8 |
| 1.143 | 7 |
| 1.154 | 13 |
| 1.167 | 6 |
| 1.200 | 5 |
| 1.222 | 3 |
| 1.231 | 13 |
| 1.250 | 4 |
| 1.286 | 7 |
| 1.300 | 10 |
| 1.308 | 13 |
| 1.333 | 3 |
| 1.375 | 8 |
| 1.385 | 13 |
| 1.400 | 5 |
| 1.417 | 12 |
| 1.429 | 7 |
| 1.444 | 9 |
| 1.462 | 13 |
| 1.500 | 2 |
| 1.533 | 15 |
| 1.538 | 13 |
| 1.556 | 9 |
| 1.571 | 7 |
| 1.583 | 12 |
| 1.589 | 12 |
| 1.600 | 5 |
| 1.615 | 13 |
| 1.625 | 8 |
| 1.667 | 3 |
| 1.682 | 11 |
| 1.700 | 10 |
| 1.714 | 7 |
| 1.750 | 4 |
| 1.778 | 9 |
| 1.800 | 5 |
| 1.833 | 6 |
| 1.846 | 13 |
| 1.857 | 7 |

| Ratio of Magnets to Coils | Phase |
|---|---|
| 1.875 | 8 |
| 1.889 | 9 |
| 1.900 | 10 |
| 1.917 | 12 |
| 1.923 | 13 |
| 2.000 | 1 |
| 2.083 | 12 |
| 2.100 | 10 |
| 2.125 | 8 |
| 2.143 | 7 |
| 2.157 | 8 |
| 2.222 | 9 |
| 2.250 | 4 |
| 2.286 | 7 |
| 2.300 | 10 |
| 2.333 | 3 |
| 2.375 | 8 |
| 2.400 | 5 |
| 2.417 | 17 |
| 2.427 | 7 |
| 2.429 | 7 |
| 2.444 | 9 |
| 2.500 | 2 |
| 2.556 | 9 |
| 2.571 | 7 |
| 2.583 | 12 |
| 2.625 | 8 |
| 2.667 | 3 |
| 2.700 | 10 |
| 2.714 | 7 |
| 2.750 | 4 |
| 2.778 | 3 |
| 2.833 | 8 |
| 2.857 | 7 |
| 2.875 | 8 |
| 2.917 | 12 |
| 3.000 | 1 |
| 3.083 | 12 |
| 3.125 | 8 |
| 3.143 | 7 |
| 3.400 | 5 |
| 3.500 | 2 |
| 4.000 | 1 |

FIG. 27

MULTI-PHASE MODULAR COIL ELEMENT FOR ELECTRIC MOTOR AND GENERATOR

RELATED APPLICATIONS

This application claims the benefit under 35 U.S.C. § 120 as a continuation-in-part of U.S. application Ser. No. 13/601,543, titled "REGENERATIVE MOTOR AND COIL," filed on Aug. 31, 2012, which is a division of U.S. application Ser. No. 12/542,412, titled "REGENERATIVE MOTOR AND COIL," filed on Aug. 17, 2009 which claims priority under 35 U.S.C. § 119(e) of provisional application No. 61/188,994, titled "REGENERATIVE MOTOR AND COIL APPARATUS," filed Aug. 15, 2008 each of which being herein incorporated by reference in their entireties.

BACKGROUND

1. Field of Invention

Aspects and embodiments of the present disclosure relate generally to electric motors and generators, and more particularly to electric motors and generators including modular power coil elements.

2. Discussion of Related Art

Conventional electric motors and generators typically include wire coils including a core formed from a ferromagnetic material, for example, iron, around which conductive wire, for example, copper wire, is wound. These wire coils are typically fixed in place within the motor or generator.

SUMMARY

Aspects and embodiments on a motor as disclosed herein may form a highly efficient electric motor which can be embodied in several configurations, including a standard motor, a hub motor, a linear motor, or other motor configuration. The motor may be regenerative, and/or may act as a part-time or full-time electrical generator. As used herein, unless otherwise specified, the term "motor" is to be understood to encompass both a motive device which converts electrical energy to mechanical energy, and a generative device which converts mechanical energy to electrical energy.

In regenerative motors, coils and cores are important elements of the design. In some embodiments, the cores in the coils contain minimal or no iron-based materials, depending on the embodiment and design performance requirements, and are used to produce magnetic flux at the point of use rather than transmitted through iron or iron laminates from a point of creation to a point of use. In embodiments disclosed herein which include discrete coils, not all of the coils must be used as full-time motor coils or generator coils. Some applications may require simultaneous use of some coils as motor driver coils and others as generator coils. For example, a portion of the generator coils may be used as a transformer of power to produce a unique required voltage or current for a given load as opposed to using a standalone transformer or other solid-state regulation device. As a second example, the motor may operate using some or all of the coils to drive a load and later an operator may signal for the motor to act as a generator, using some or all of the coils for regenerative braking, such as in an electric vehicle application. Coils may also be disabled in an individual or collective basis as needed for incremental increase or decrease of motor torque output or generator input.

In motor configurations, the coils are controlled by an electrical timing system, which inputs electrical energy into the coils in a cyclical +/+ and −/+ alternation fashion. Timing can be adjusted by retarding or advancing the point at which the electrical input switches from +/− to −/+ and −/+ to +/−. The adjustment of the timing can affect both torque and speed. Optimal timing results in higher efficiency relative to suboptimal timing.

In generator configurations, the coils can be used to drive a load, in some embodiments through a power rectification device which converts the alternating current to direct current.

In embodiments where the motor is used as a part time motor and generator, a control circuit for the motor may be capable of switching between a coil power switching circuit path and a rectifier output circuit path.

In a standard motor configuration where the stator is stationary and the rotor rotates, a motor according to an embodiment disclosed herein is an electric motor that contains one or more stationary stators, each of which optimally includes a rotor on each side of each stator with a single rotor between each stator segment. Embodiments of the motor may include a shunt path outside of the rotor on each end of the stator/rotor stack. The motor may include one or more magnets in the rotors arrayed as disclosed herein and one or more coils in the stators arrayed as disclosed herein. Embodiments of the motor may include internal or external motor control circuitry. Embodiments of the motor may include an epicyclic gear set within one or more of the rotors, and optionally, a locking or clutch mechanism for locking the ring gear of the epicyclic gear set relative to the motor housing or stators.

In a hub motor configuration, a motor according to an embodiment disclosed herein is an electric motor that attaches to a stationary or moving spindle or axle. The motor may contain one or more stators of rotors. The one or more stators or rotors may include permanent magnetic material in the rotor and coils in the stator including little, if any, iron-based or ferromagnetic core material. The motor may include internal or external motor control circuitry. The motor may connect to internal or external energy storage. The motor may optionally include a system for receiving remote control instructions, may optionally include a system for sending remote status updates to a central control computer, may optionally include an internal epicyclic gear set, and may optionally include a locking or clutch mechanism for locking the spindle to the motor output.

In a linear motor configuration, a motor according to an embodiment disclosed herein is an electric motor that contains a linear stator and rotor or linear stator/rotor stack, rotors having one or more magnets, and stators having one or more coils.

Radially-oriented motors are variations from the above motors (and generators) in that the magnets and coils (or coils and coils) are oriented along radials rather than axial parallels. For example, in a standard motor configuration the motor may be configured with magnets around a rotor on the outer cylindrical surface and coils may be disposed on a stator configured in a concentric array aligned radially from the rotor. This concept is also able to be used in rotor/stator stacks, or multiple concentric arrays of magnets and coils or arrays of coils on a rotor and coils on a stator. The design may be scaled by adding more concentric arrays or by stacking multiple sections of concentric arrays along the motor axis.

Motors as disclosed herein may be embodied in other motor configurations, including but not limited to pancake motors and cup motors. In some embodiments, the coils drive or are driven by permanent magnets; however, in other embodiments the coils can be used to drive or be driven by other coils.

Accordingly, in one aspect disclosed herein, there is provided a motor composed of a stator and a rotor. The stator includes an array of coils arranged therein. The rotor includes an array of magnets arranged therein. Each of the coils includes a first winding of wire wrapped around a core. The wire may have a non-circular cross-section.

In some embodiments, the wire is a flattened wire. In some embodiments, each of the coils further includes a second winding of wire wrapped around the core. In some embodiments, the first and second windings are made up of a single wire, and in some embodiments, the first and second windings are oriented opposed to each other. The windings may be formed in a first printed circuit board in a spiral form.

In some embodiments, the motor includes a plurality of coil modules and each of the coils is arranged in each of the coil modules.

In some embodiments, the core is a substantially ironless core. The core may be substantially free of ferromagnetic material. The core can be an air core.

In some embodiments, the core includes a shape generally matching a cross-sectional shape of the magnet. In some embodiments, the core is non-circular.

The core may be composed of a gauge wire. Alternatively, the core may be composed of thin steel with a slit.

The motor may be a hub motor. Alternatively, the motor may be a linear motor. In some embodiments, the motor is a regenerative motor. In some embodiments, each of the coils of the motor may be regulated separately. Additionally or alternatively, the motor may include an epicycle gear set.

In an alternative embodiment, there is provided a motor having a stator and a rotor. The stator includes an array of coils arranged in the stator, and the rotor includes an array of magnets arranged in the rotor. Each of the coils includes a winding of wire wrapped around a core, and each of the magnets includes a first pole face, a second pole face and a middle portion between the first pole face and the second pole face. The first pole face may be narrower than the middle portion.

In some embodiments, the second pole face is narrower than the middle portion. In some embodiments, the magnet includes a first step formed adjacent to the first pole face. The magnet may further include a second step formed adjacent to the second pole face. The first and second steps may be pie-shaped steps. Alternatively, the magnet may include an angled edge formed adjacent to the first pole face.

The array of magnets may be arranged circumferentially around an axis of the rotor. In this embodiment, the magnet includes an inner end disposed proximate to the axis of the motor and an outer end disposed distant from the axis of the motor. The inner end of the magnet may be narrower than the outer end of the magnet. In some embodiments, the inner end of the first pole face of the magnet is narrower than the outer end of the first pole face of the magnet. Each of the magnets may be composed of two or more magnet pieces stacked one on top of the other. In some embodiments, the core includes a shape generally matching a shape of the first pole face of the magnet.

In an alternative embodiment, there is provided a motor having a stator and a rotor. The stator includes an array of coils arranged in the stator, and the rotor includes an array of magnets arranged in the rotor. Each of the coils includes a winding of wire wrapped around a core. The core may include a first pole face, a second pole face and a middle portion between the first and second pole faces. In this embodiment, the middle portion includes a reduced width as compared to the first and second pole faces.

In an alternative embodiment, there is provided a motor having a stator and a first rotor. The stator includes an array of coils arranged in the stator, and the first rotor includes an array of magnets arranged in the first rotor. Each of the coils includes a winding of wire wrapped around a core. Each of the magnets includes a width, a length, and a height. The core includes a width, a length, and a height. In this embodiment, each of the magnets is distanced from adjacent magnets by a magnet distance, and the magnet distance is no less than the width of the magnet.

In some embodiments, the magnet distance is no more than the length of the magnet. The motor may further include a second rotor having an array of magnets arranged in the second rotor. The magnets of the first rotor are distanced from adjacent magnets of the second rotor by a magnet gap, and the magnet distance is no less than the magnet gap.

In some embodiments, the width of the core is no less than the width of the magnet. In some embodiments, the height of the magnet is no less than the height of the core.

In another aspect, there is provided a coil module for a motor. The coil module includes a core and a first winding of a wire wrapped around the core. The wire may have a non-circular cross-section.

The wire may be a conductor path printed on a printed circuit board in a spiral form. The wire may be a flattened wire.

In another aspect, there is provided a motor. The motor comprises a rotor including a plurality of magnets and a coil module including a plurality of coils of conductive material. The plurality of coils are arranged in a substantially common plane horizontally displaced from one another and retained in a material forming a portion of a body of the coil module.

In accordance with some embodiments, the motor includes a plurality of coil modules, each of the plurality of coil modules being separately installable and removable.

In accordance with some embodiments, the plurality of coil modules are included in a stator of the motor.

The modularity of the coil modules may allow the coil modules to be easily field serviceable to add, remove, or replace coil modules. The modularity of the coil modules may also provide for flexibility in the design of a motor. A motor may be expanded by adding or removing rotors and/or coil modules to suit the desire of an end user. For example, a motor may be provided with a certain number of coil modules, for example, four, to produce a certain amount of power, for example, 10 kW. If additional power were desired, additional coil modules could be added to the motor. For example, the addition of one more coil module could increase the power output of the motor by 25% to 12.5 kW. Additional rotors and coil modules could be added to the motor if there was insufficient space to add additional coil modules between the existing rotors.

In accordance with some embodiments, the coil module is removable from the motor while the motor is in operation.

In accordance with some embodiments, the plurality of coil modules include electrical connectors and sockets configured to receive one of a first plug-in module and a second plug-in module, the first plug-in module configured to provide for the at least one coil module to output alternating current through the electrical connector responsive to movement of the rotor, the second plug-in module configured to provide for the at least one coil module to output alternating current through the electrical connector responsive to movement of the rotor.

In accordance with some embodiments, the plurality of coil modules include one or more features disposed on sides of the plurality of coil modules, the one or more features configured to engage corresponding one or more features of adjacent coil modules of the plurality of coil modules upon positioning of the plurality of coil modules in the motor and connect adjacent coil modules.

In accordance with some embodiments, the plurality of coil modules are configured to both induce motion of the rotor responsive to a supply of electrical current to the plurality of coil modules and to produce an electrical current responsive to motion of the rotor.

In accordance with some embodiments, the plurality of coils are disposed at angles with respect to each other.

In accordance with some embodiments, the plurality of coils are disposed substantially parallel to each other.

In accordance with some embodiments, the material forming the portion of the body includes a first material and one of a strengthening material and a material that enhances the thermal conductivity of the material forming the portion of the body.

In accordance with some embodiments, the plurality of coils include cores at least partially filled with the material forming the portion of the body.

In accordance with some embodiments, a maximum number of the plurality of coil modules form a complete stator assembly and the motor is operable with less than the maximum number of coil modules installed.

In accordance with some embodiments, the motor is operable with at least one of the plurality of coils being one of deactivated and damaged.

In accordance with some embodiments, the plurality of coil modules include one or more handles, thermal sensors configured and arranged to provide a signal indicative of a temperature of a coil of the plurality of coil modules, and indicators configured and arranged to provide information regarding the state of operation of a coil the plurality of coil modules.

In another aspect, there is provided a modular coil assembly for an electromagnetic motor, the coil assembly comprising a plurality of coils of conductive material, wherein each coil is displaced from another coil and retained in the coil assembly.

In accordance with some embodiments, the modular coil assembly is configured and arranged to operate as a stator in electromagnetic communication with a rotor within an electromagnetic motor.

In accordance with some embodiments, the modular coil assembly further includes an electrical connector and a socket configured to receive a first plug-in module, the first plug-in module configured to provide for the modular coil assembly to output alternating current through the electrical connector responsive to movement of the rotor.

In accordance with some embodiments, the modular coil assembly further includes an electrical connector and a socket configured to receive a second plug-in module, the second plug-in module configured to provide for the modular coil assembly to output alternating current through the electrical connector responsive to movement of the rotor.

In accordance with some embodiments, the modular coil assembly is configured to both induce motion of the rotor responsive to a supply of electrical current to the modular coil assembly and to produce an electrical current responsive to motion of the rotor.

In accordance with some embodiments, the plurality of coils are disposed at angles with respect to each other.

In accordance with some embodiments, the plurality of coils are disposed substantially parallel to each other.

In accordance with some embodiments, the plurality of coils are retained in a matrix material, the matrix material including a first material and a strengthening material.

In accordance with some embodiments, the plurality of coils are retained in a matrix material, the matrix material including a first material and a material that enhances the thermal conductivity of the matrix material.

In accordance with some embodiments, the plurality of coils include cores at least partially filled with the matrix material.

In accordance with some embodiments, the modular coil assembly further comprises one or more of a handle, a thermal sensor configured and arranged to provide a signal indicative of a temperature of a coil of the modular coil assembly, and an indicator configured and arranged to provide information regarding the state of operation of a coil of the modular coil assembly.

In another aspect, there is provided a motor comprising a rotor including a plurality of magnets and a coil module including a plurality of coils of conductive material, the plurality of coils arranged in a substantially common plane horizontally displaced from one another and.

In accordance with some embodiments, the coil module is retained in a material forming a portion of a body of the coil module.

In accordance with some embodiments, the coil module is embedded in a material forming a portion of a body of the coil module.

In accordance with some embodiments the motor includes one or more additional coil modules.

In accordance with some embodiments, each of the coil modules is separately installable in the motor.

In accordance with some embodiments, one or more of the coil modules includes one or more features configured to engage with corresponding one or more features on one or more other coil modules.

In accordance with some embodiments, each of the coil modules is separately removable from the motor.

In accordance with some embodiments, one or more of the coil modules form a stator assembly.

In accordance with some embodiments, the motor is operable with at least one of the plurality of coils being deactivated or damaged.

In accordance with some embodiments, the coil module is removable and replaceable from the motor.

In accordance with some embodiments, the coil module is included in a stator of the motor.

In accordance with some embodiments, the coil module is removable from the motor while the motor is in operation.

In accordance with some embodiments, the coil module is installable in the motor while the motor is in operation.

In accordance with some embodiments, the coil module includes an electrical connection configured to output electrical power.

In accordance with some embodiments, the electrical connection is configured to output multi-phase alternating current.

In accordance with some embodiments, the electrical connection is configured to output a signal from a thermal sensor disposed within the coil module.

In accordance with some embodiments, the motor includes an electrical connector configured to receive a plug-in module configured to output alternating current.

In accordance with some embodiments, the motor includes an electrical connector configured to receive a plug-in module configured to output direct current.

In accordance with some embodiments, the coil module is configured to induce motion of the rotor responsive to a supply of electrical current to the coil module.

In accordance with some embodiments, the coil module is configured to produce an electrical current responsive to motion of the rotor.

In accordance with some embodiments, the coil module is configured to produce multi-phase electrical current responsive to motion of the rotor.

In accordance with some embodiments, the plurality of coils are disposed substantially parallel to each other.

In accordance with some embodiments, the coil module includes a shell made of plastic.

In accordance with some embodiments, the coil module includes material that enhances thermal conductivity of the plastic.

In accordance with some embodiments, one or more of the plurality of coils are retained in the plastic and the material that enhances thermal conductivity of the plastic.

In accordance with some embodiments, the coil module includes a handle.

In accordance with some embodiments, the coil module includes one or more thermal sensors configured to provide a signal indicative of a temperature.

In accordance with some embodiments, the coil module includes one or more indicators configured to provide an indication of the operation of one or more coils.

In another aspect, there is provided a modular coil assembly for an electromagnetic motor, the coil assembly comprising a plurality of coils of conductive material, wherein each coil is horizontally displaced from another coil and retained in the coil assembly.

In accordance with some embodiments, the modular coil assembly is configured and arranged to operate as a stator in electromagnetic communication with a rotor within an electromagnetic motor.

In accordance with some embodiments, the modular coil assembly is configured to produce multi-phase alternating current responsive to movement of the rotor.

In accordance with some embodiments, the modular coil assembly is configured to induce motion of the rotor responsive to a supply of electrical current to the modular coil assembly.

In accordance with some embodiments, the modular coil assembly is configured to produce an electrical current responsive to motion of the rotor.

In accordance with some embodiments, the modular coil assembly includes an electrical connector to receive a plug-in module configured to output alternating current.

In accordance with some embodiments, the modular coil assembly includes an electrical connector to receive a plug-in module to output direct current.

In accordance with some embodiments, the plurality of coils are disposed at angles with respect to each other.

In accordance with some embodiments, the plurality of coils are disposed substantially parallel to each other.

In accordance with some embodiments, the plurality of coils are retained in a matrix material, the matrix material including a first material a strengthening material or a material that enhances the thermal conductivity of the matrix material.

In accordance with some embodiments, the plurality of coils are retained in a matrix material, the matrix material including a first material and a material that enhances the thermal conductivity of the matrix material.

In accordance with some embodiments, one or more of the plurality of coils includes a core at least partially filled with a matrix material.

In accordance with some embodiments, the modular coil assembly further comprises a handle.

In accordance with some embodiments, the modular coil assembly further comprises a thermal sensor configured and arranged to provide a signal indicative of a temperature of a coil of the modular coil assembly.

In accordance with some embodiments, the modular coil assembly further comprises an indicator configured and arranged to provide information regarding a state of operation of a coil of the modular coil assembly.

Further areas of applicability of the aspects and embodiments disclosed herein will become apparent from the detailed description provided hereinafter. It should be understood that the detailed description and specific examples, while indicating the preferred embodiment of the disclosure, are intended for purposes of illustration only and are not intended to limit the scope of the invention.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 27 shows a table of the number of phases at a given ratio of magnets to coils;

DETAILED DESCRIPTION

Figure 1:
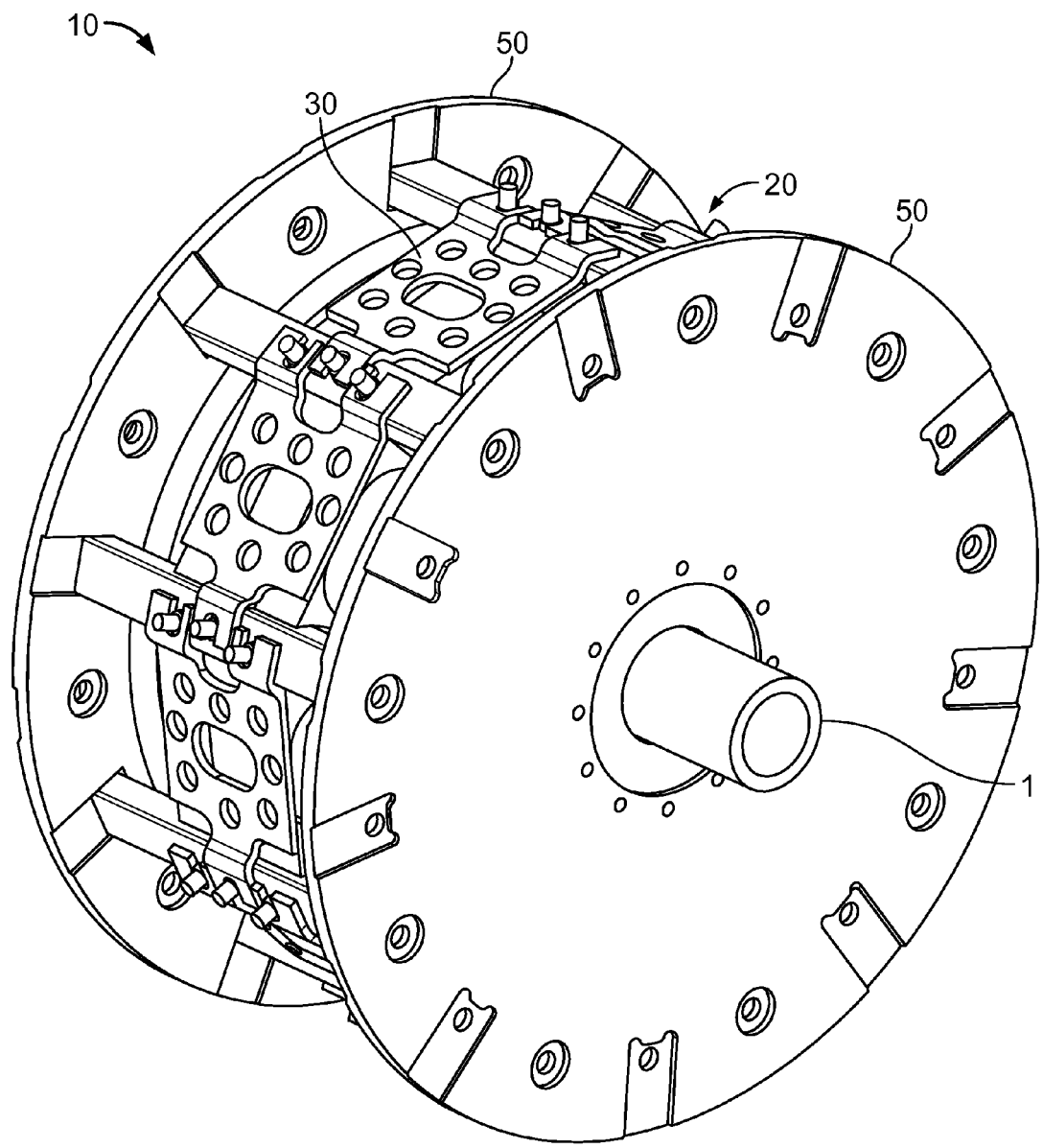
FIG. 1 is a perspective view of an embodiment of a motor according to an embodiment of the present invention.

Aspects and embodiments as disclosed herein are not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Figure 2:
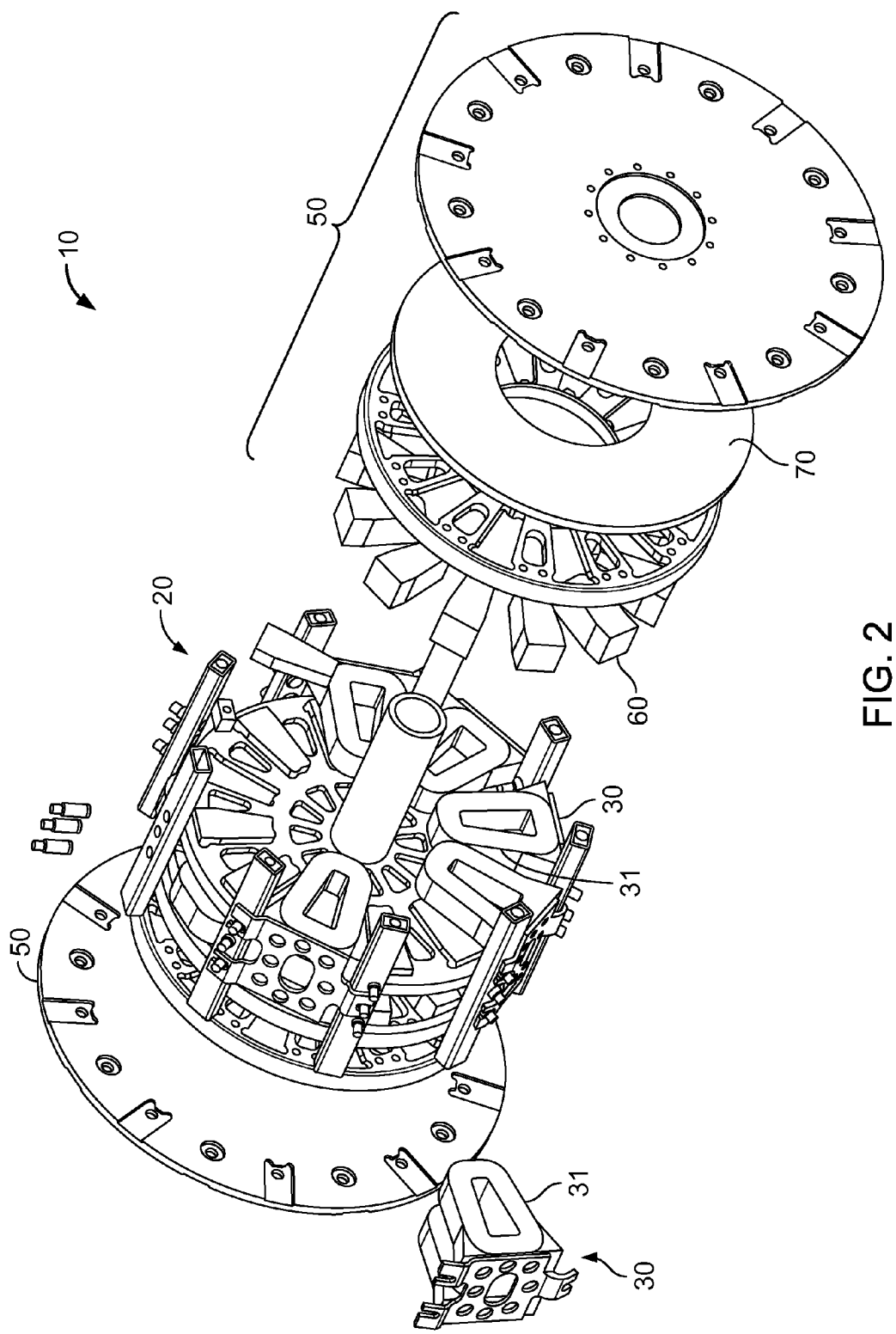
FIG. 2 is a partially exploded view of the motor of FIG. 1.

Shown in FIGS. 1 and 2 is a motor 10 that comprises a stator 20 sandwiched between a pair of rotors 50. FIG. 2 is a partially exploded view of the motor 10. The motor 10 shown in FIGS. 1 and 2 uses a single rotor-stator-rotor configuration. The stator 20 includes one or more arrays of coil 31. Each of the rotors 50 includes one or more arrays of magnets 60. The design may be scaled to include fewer or more magnets 60 per rotor section 50 or fewer or more coils 31 per stator section 20. In the case of an induction motor, the rotor 50 will contain an array of coils instead of magnets.

The number of stator-rotor sections versus stator and rotor thicknesses may be selected to provide a desired level of performance versus cost as a given application demands. In some embodiments, a high level of performance may be achieved when the thickness of the stator 20 does not exceed the twice the thickness of the magnets 60 in a given rotor 50. It is possible to use different thicknesses of rotors 50 and stators 20 and different individual thicknesses for any given rotor 50 or stator 20. It may be desirable to use a thicker rotor 50 at each axial end of the motor 10.

A "stator-rotor section" in a rotary motor (or generator) is defined to be an axially positioned rotor 50 followed by an axially positioned stator 20 followed by an axially positioned rotor 50. A "stator-rotor stack" is defined to be a rotor 50 followed by a stator 20 followed by a rotor 50 followed by a stator 20 followed by a rotor 50 in a repeating pattern where each end of the stack is preferably a rotor 50 ("end rotor"), which in some embodiments, is configured with a magnetic shunt path 70 on the axially outer ends of the stack. The stator-rotor sections in the stack are counted by the number of stators 20 in the stack.

A "stator-rotor section" in a linear motor (or generator) is defined to be linearly positioned and arrayed rotor 50 next to a linearly positioned and arrayed stator 20 followed by a linearly positioned and arrayed rotor 50, stator 20 being used to describe the stationary component and rotor 50 being used to describe the moving part, although both parts can be configured to move as needed. The rotor 50 or the stator 20 may contain the coils 31 or the magnets 60 as needed. A "stator-rotor stack" in a linear motor is defined to be a rotor 50 positioned next to a stator 20 followed by a rotor 50 positioned next to a stator 20 followed by a rotor 50 in a repeating pattern where each end of the stack is preferably a rotor 50 ("end rotor"), which in some embodiments, is configured with a magnetic shunt path 70 on the axially outer ends of the stack. The stator-rotor sections in the stack are counted by the number of stators 20 in the stack.

Each of the herein described embodiments may be configured as a motor, a generator, or a part-time motor and generator, or a partial motor and partial generator as determined by the number of coils 31 used as driver coils or generator coils, noting that any one coil 31 may be configured to change as needed from generator to motor operating modes.

Figure 3A:
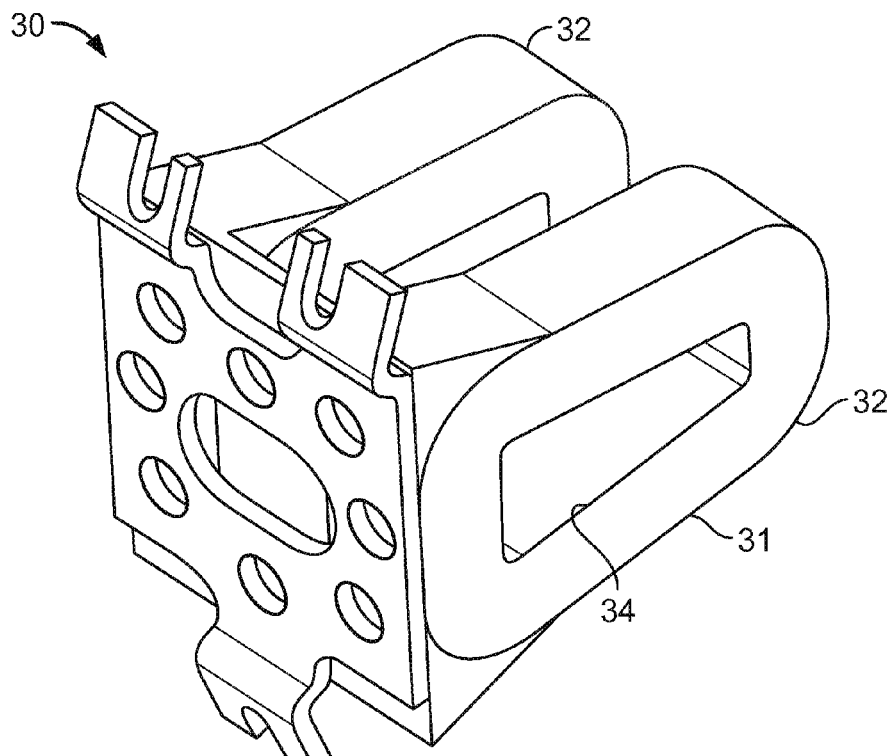
FIG. 3A is an enlarged view of the coil module of the stator of the motor of FIG. 1.

In the embodiment illustrated in FIGS. 1 and 2, the stator 20 includes a plurality of coil modules 30. As best seen in FIG. 3A, each of the coil modules 30 includes a coil 31. In some embodiments, the coil 31 is composed of a pair of windings 32 around a core 34. Alternatively, the coil module 30 may include a single winding 32 or may have more than two windings 32. In the illustrated embodiment, the core 34 is in a non-circular shape. As shown in FIGS. 4, 5, 6, 8, 9 and 10, however, the core 34 may be formed in a circular shape. The winding 32 is in some embodiments made up of a wire 33 with a good conductivity, for example, copper. The wire 33 is in some embodiments insulated.

Figure 4:
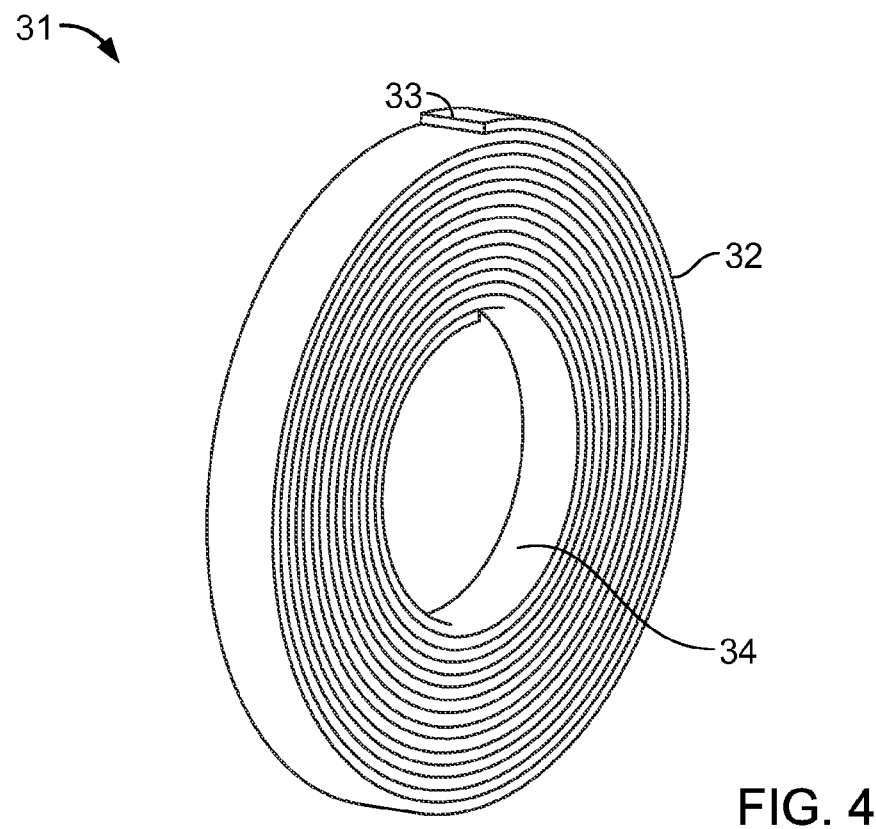
FIG. 4 is a perspective view of a variant of an electromagnetic coil, wherein the coil is made up of a winding of a flattened wire wrapped around a circular air core.

In the embodiment illustrated in FIG. 4, the wire 33 is flattened and wrapped around the core 34 which is in a circular shape. Use of a flattened wire 33 can facilitate reduction in air gaps, optimize the magnetic flux pattern, and increase the integrity of the winding 32. The wire 33 may be otherwise non-circular in cross-sectional shape. In some embodiments, the wire 33 may be circular in cross-sectional shape.

Figure 5:
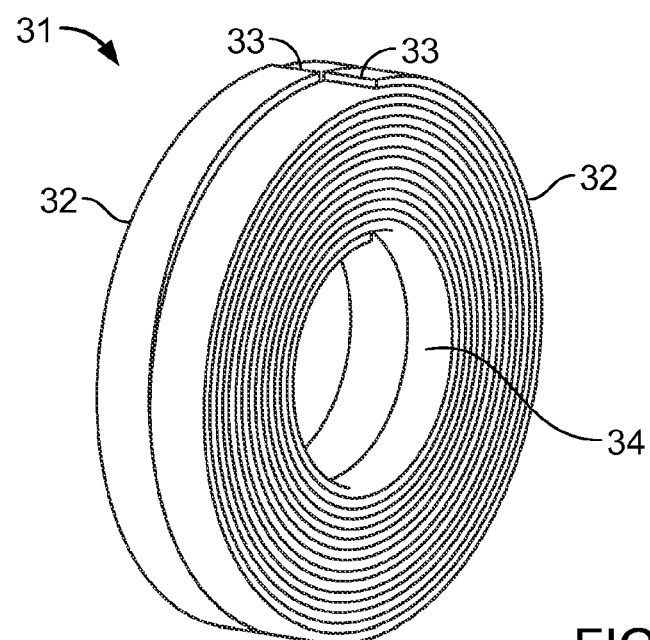
FIG. 5 is a perspective view of another variant of an electromagnetic coil, wherein the coil comprises two sets of side-by-side windings of a flattened wire wrapped around a circular air core, with the windings oriented opposed to each other.
Figure 6:
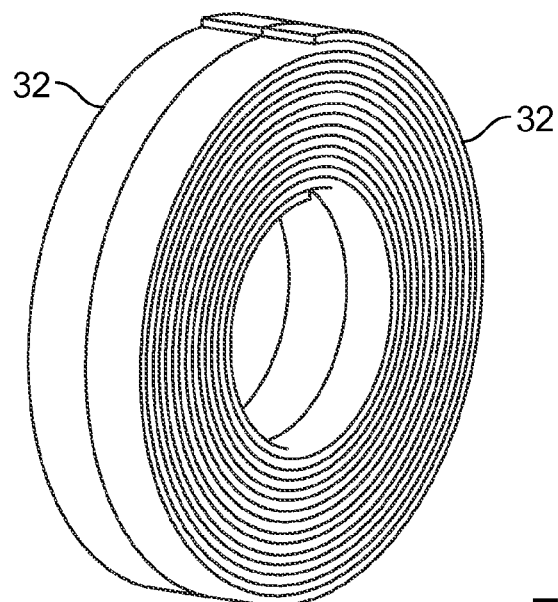
FIG. 6 is a perspective view of another variant of an electromagnetic coil, wherein the coil comprises two sets of side-by-side windings of a flattened wire wrapped around a circular air core, with the windings oriented in the same direction.

In the embodiment as illustrated in FIG. 5, the coil 31 is made up of two side-by-side windings 32 of flattened wire 33. The flattened wire 33 is wound continuously from the center side to the outside to form a winding 32, and then the same wire 33 is again wound from the center side to the outside to form a separate winding 32 so that two windings 32 made up of the single wire 33 are arranged side-by-side on the same core 34. Because the two windings 32 are made up of the same wire 33, both ends of the wire 33 are disposed at the outside of the windings 32. This side-by-side windings can be repeated over and over on the same core 34 in groups of even numbers of windings 32 so that both ends of the wire 33 can always be located either at the center side or at the outside of the windings 32. In FIG. 5, the two windings 32 are oriented opposed to each other. The opposed orientation promotes an optimal through-coil magnetic flux creation. Alternatively, the two windings 32 may be oriented in the same direction as shown in FIG. 6.

Although even numbers of windings 32 are utilized in some embodiments, odd numbers of windings 32 may also be used if the designer desires to have a central wire end and an outer wire end. However, leaving a single wire to cross from the center side to the outside of the windings 32 may distort the induced magnetic flux field and reduce coil performance and efficiency.

Figure 7:
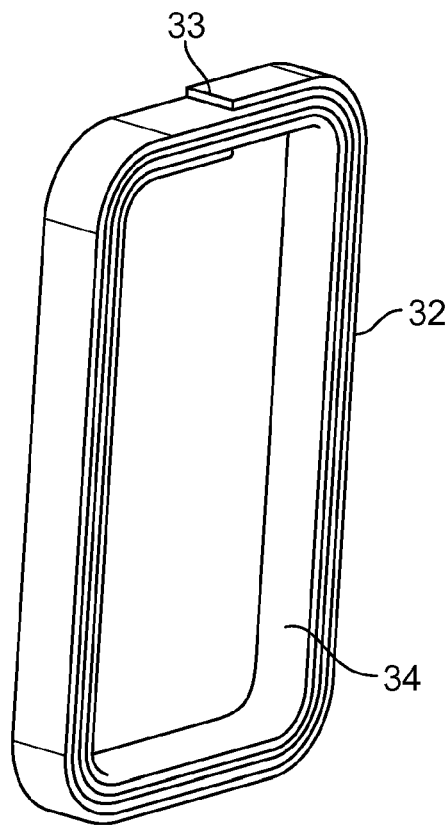
FIG. 7 is a perspective view of another variant of an electromagnetic coil, wherein the coil comprises a winding of a flattened wire wrapped around a generally rectangular air core.

In the embodiment as illustrated in FIG. 7, the coil 31 is made up of a winding 32 of a flattened wire 33 wrapped around a rectangular core 34. As in FIG. 5 or 6, two or more windings 32 may be arranged side-by-side. In addition, the core 34 may be non-circular and non-rectangular.

In FIGS. 4, 5, 6 and 7, no wires are left across the face of the winding 32. The wire 33 is wound so that both ends of the wire 33 where they need to be connected to a power source are located on the outside of the winding 32. Alternatively, both ends of the wires 33 can be located on the same inner side of the coil 32 (or other convenient location). In some embodiments, each winding 32 is designed so that it will function as a stand-alone coil, even if included in a parallel or series chain of additional windings.

In FIGS. 4, 5, 6 and 7, the wire 33 is wound such that the larger flat surface thereof is facing in a direction perpendicular to an axis of the coil 31. However, in some embodiments the wire 33 may be wound such that the larger flat surface thereof is facing in a direction parallel with the axis of the coil 31.

The individual windings 32 may be bonded together with an appropriate insulator or bonding agent to prevent movement or to give the coil 31 an overall structural integrity. The coils 31 may be encapsulated in another material, such as plastic, or may be sandwiched between other thin materials for additional structural integrity.

Figure 8:
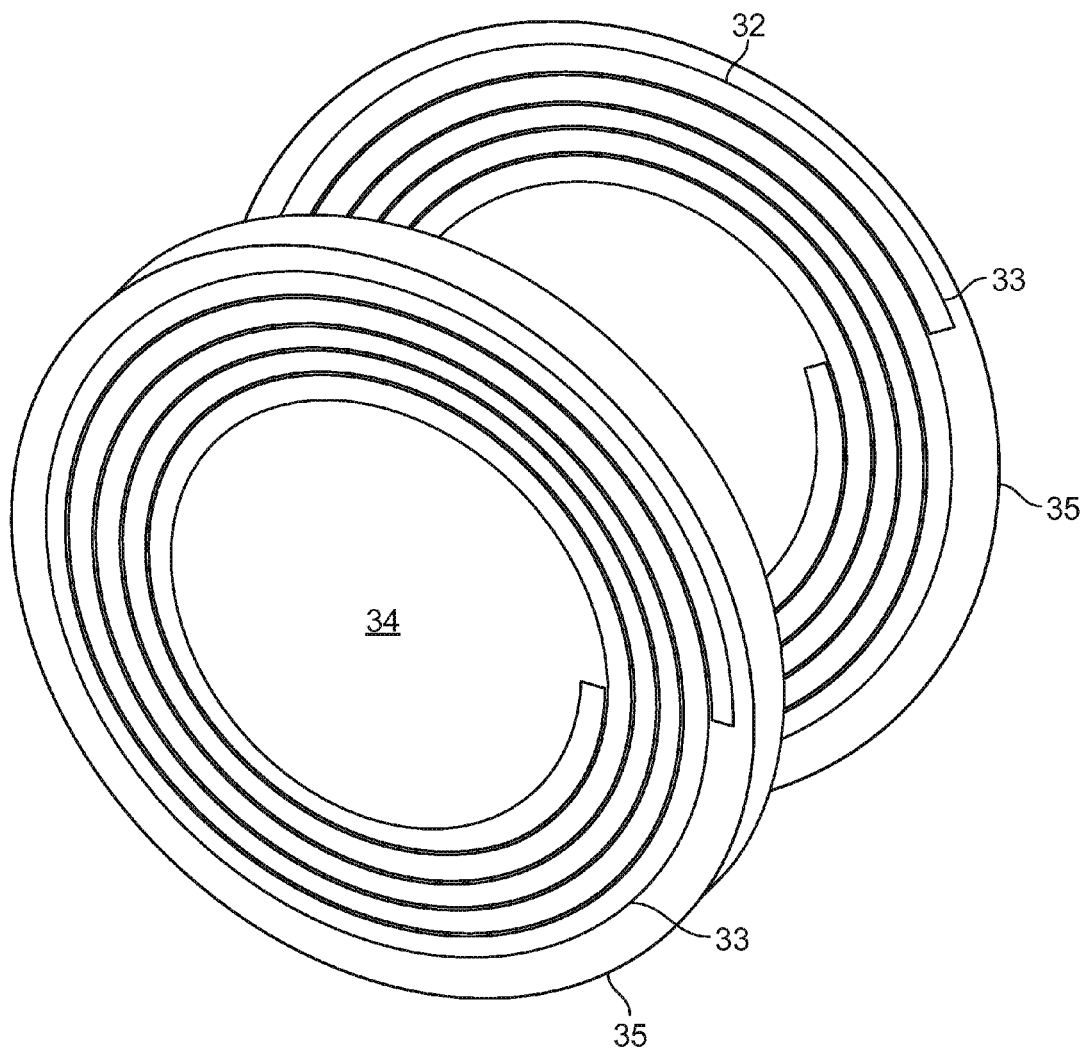
FIG. 8 is a perspective view of another variant of an electromagnetic coil, wherein the coil is formed by layering a plurality of printed circuit boards.

In the embodiment as illustrated in FIG. 8, the coil 31 is made up of a plurality of printed circuit boards 35. Each of the printed circuit boards 35 includes a conductor path 33 a printed therein in a spiral shape about the core 34 so as to form a winding 32. Accordingly, the plurality of printed circuit boards 35 are layered to form a plurality of windings 32. Alternatively, the coil 31 may be composed of a single printed circuit board 35 to form a single winding 32. The printed conductor path 33 a can have circular or other concentric shape, which generally matches the shape of the core 34, which in turn generally matches the shape of the magnet 60.

Figure 3B:
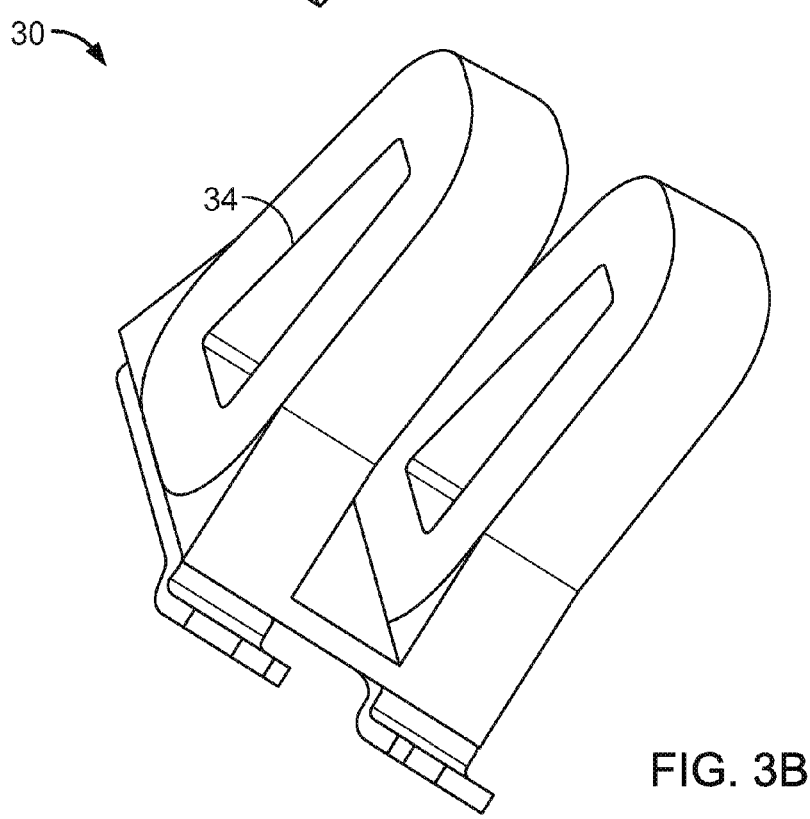
FIG. 3B is another enlarged view of the coil module of FIG. 3A from a different direction.

As shown in FIGS. 4, 5 and 6, the coils 31 may be wrapped around a circular core shape, or as shown in FIGS. 3A, 3B, and 7 the coils 31 may be wrapped around a non-circular shape. The coils 31 may be composed of a good electrical conductor, for example, copper. The windings 32 are in some embodiments composed of insulated wire 33. The wire 33 may be circular or non-circular in cross-sectional shape. As shown in. FIGS. 4, 5 and 6, a flattened wire may be particularly effective. As shown in FIG. 8, the windings 32 may be made up of multiple layered circuit boards 35 with circular, spiral, or other concentric shapes which generally match the shape of the core 34, which generally matches the shape of the magnet 60.

As best seen in FIG. 2, the cross-sectional shape of the core 34 is in some embodiments substantially similar to or exactly the same as the normal, or facing, cross-sectional shape of the magnets 60 of the rotor 50. The cross-sectional size of the core 34 may also be substantially similar to or the same as the normal, or facing, cross-sectional size of the magnets 60. This core design allows for maximum focus of the magnetic flux perpendicular toward the magnets 60 of the rotor 50 while minimizing any resistance (and therefore loss) to the flux.

As best seen in FIGS. 2 and 3, the stator 20 is in some embodiments composed of an array of coils 31. Three stator categories are used: an integrated stator where the coils 31 and stator 20 are bonded together as a single unit or module, a partially integrated stator where some of the coils 31 are bonded together as a single unit or module, and a unitized stator where individual coils 31 are separately used whether exposed or encapsulated for ease of individual coil replacement for a completely modular design with a single coil 31 as the basic unit of the modular design.

Multiple stators 20 may be linked together using axially aligned support structures and coil modules 30 or groups of coils 31 may be linked in the axial direction. Individual coils 31 within the stator 20 may be wired in parallel or series or in parallel/series combinations as needed for optimal use of the available current and voltage from an available power source. The electronics interfacing with the stator coils 31 may be configured to switch the coils 31 into parallel and series or combinations of parallel and series from stand-alone, series, parallel, or parallel/series combinations as needed on demand.

It may be advantageous in some designs to create a steel flux path from one coil 31 to the next coil 31 within the stator 20 in a path that does not cross excessively close to the magnet path. In high speed designs this option may not be desirable.

Figure 9:
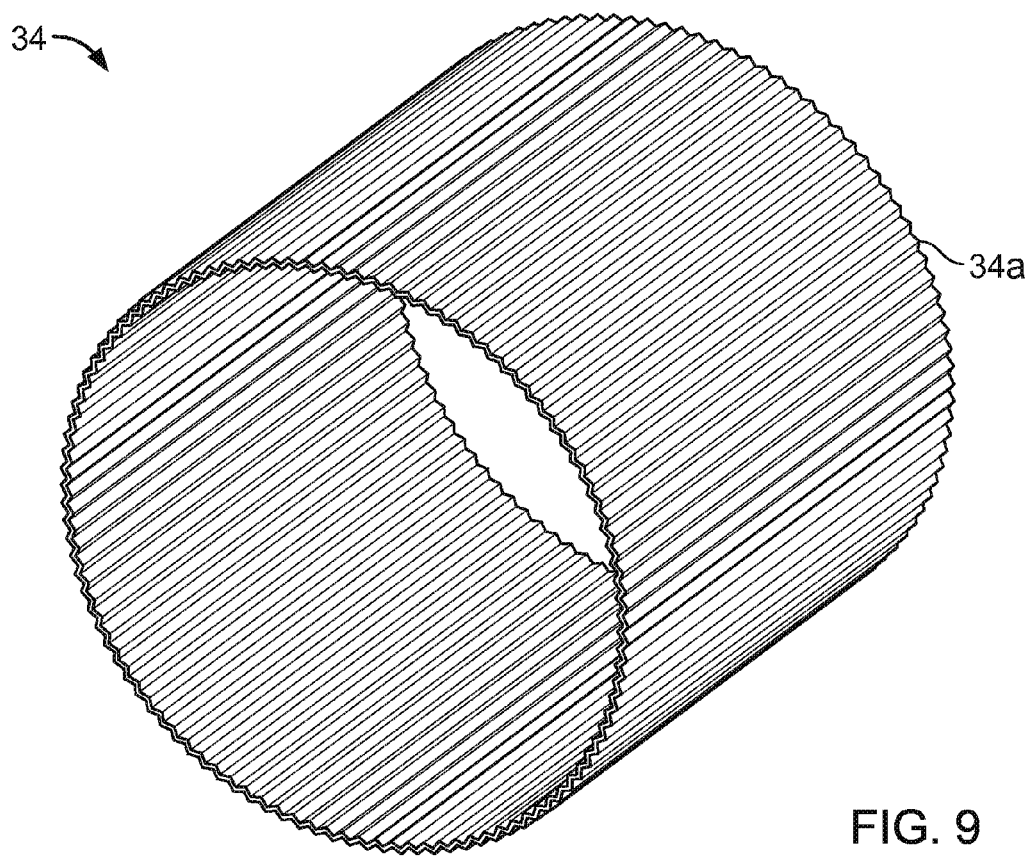
FIG. 9 is a perspective view of a variant of an electromagnet core, wherein the core is made up of a series of small gauge wires.

The cores 34 used in embodiments of the disclosed motor may be made in multiple configurations and from multiple materials. In an embodiment as shown in FIG. 9, the core 34 may be made up of a series of small gauge wires 34a, which in some embodiments are hard steel wires of a very small diameter. The distance between the gauge wires 34a is in some embodiments less than the diameter of the gauge wire 34a for a better performance. In some embodiments each gauge wire 34a is spaced from the adjacent one by the same spacing distance as is equal to the diameter of the gauge wire 34a. However, a variety of spacing distances between the individual gauge wires 34a may also be utilized. Wider spacing may be appropriate for higher RPM, lower efficiency designs. The gauge wires 34 a may be oriented for optional directional focusing effect of the magnetic flux through the coil 31.

Figure 10:
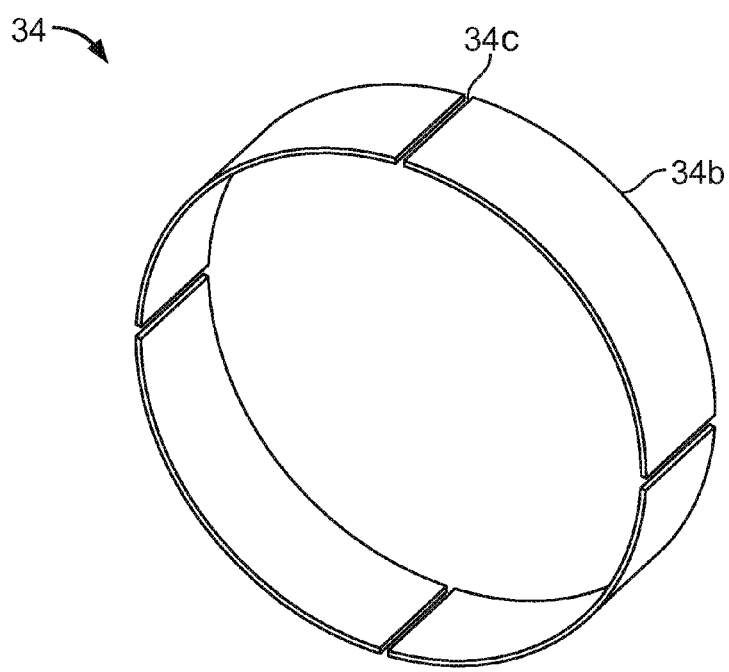
FIG. 10 is a perspective view of another variant of an electromagnet core, wherein the core is made up of thin steel with slits.

In the embodiment as shown in FIG. 10, the core 34 is made up of thin steel 34b with one or more small breaks or slits 34c. The thin steel 34b may be hard steel with a width of a few thousands of an inch. The orientation of the thin steel 34b and the slits 34c may be selected to facilitate a directional focusing effect of the magnetic flux through the coil 31. The slits 34c may prevent the magnetic flux from inducing a current which travels around the core 34.

Figure 11:
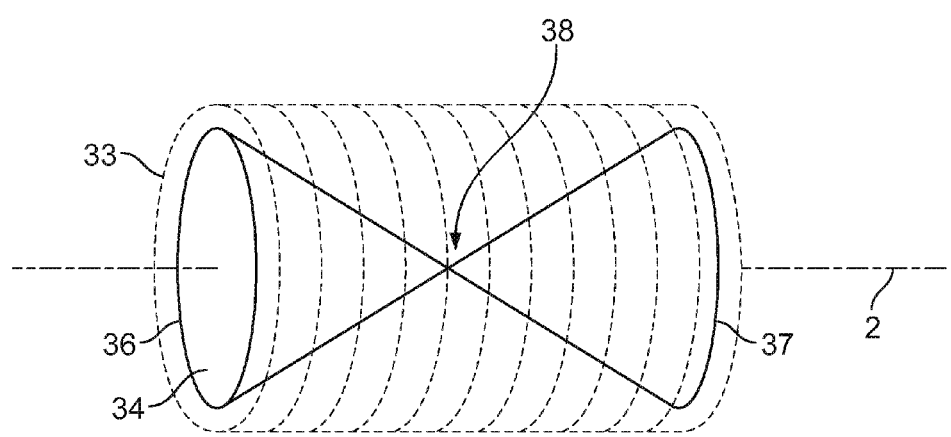
FIG. 11 is a perspective view of another variant of an electromagnet core, wherein the core includes a reduced width in the middle portion.

In the embodiment illustrated in FIG. 11, the core 34 includes a first pole face 36, a second pole face 37, and a middle portion 38 between the first and second pole faces 36, 37 along a center axis 2. The middle portion 38 has a reduced width as compared to the first and second pole faces 36, 37. This configuration maintains the width of core at the pole faces 36, 37 while increasing the winding area and the number of turns in the middle portion 38. Accordingly, the flux is increased at the pole faces.

The core 34 of embodiments of electromagnetic coils disclosed herein may include little or no iron or other ferromagnetic material. When a little iron is used in a core, it may be desirable to use hard steel as little as possible to focus the lines of force as desired. However, soft iron may also be used with some loss of efficiency. Embodiments of electromagnetic coils as disclosed herein have been tested with small gauge piano wire, very thin, axially segmented shim material, tubes, and solid shapes. In conventional motors, iron cores are used to transmit the flux from where it is created from the copper windings to where it is used at the rotor/stator interface area. In embodiments of the present invention, the flux does not need to be transmitted from a point of creation to a point of use because the flux is created right where it is to be used.

For a less expensive or easier to produce the core 34, a designer can use no core material at all (perhaps a non-ferrous core for coil winding purposes which may or may not be removed after winding), a soft iron tube, or a thin layer of iron filings encased in a binder, which may be subjected to a magnetic field prior to the binder setting up.

High efficiency may be obtained with a lower speed materially optimized core design. However, in the case of high speed operations, an air core (no core) or a lesser amount of hard steel may be used.

While highly efficient core designs are shown in the embodiments presented here, alternate embodiments may include less efficient core designs, for which there are a variety of reasons to consider, including manufacturing costs and reduction of electrical spike kick-back through the power circuits.

In some embodiments, the rotors 50 of electric motors disclosed herein are designed with one or more arrays of magnets 60 contained within the rotor 50. FIGS. 12A through 12D show variants of the magnets 60. The magnets 60 may include an inner end 61 to be disposed proximate or adjacent the central axis 1 of the motor 10 and an outer end 62 to be disposed away from or distant the central axis 1 of the motor 10. The magnets 60 may also include a top surface 63 and a bottom surface 64. In some embodiments, when the magnets 60 are mounted in a rotor 50, the top surfaces 63 face toward the stator 20. The top surface 63 may function as a pole end.

Figure 12A:
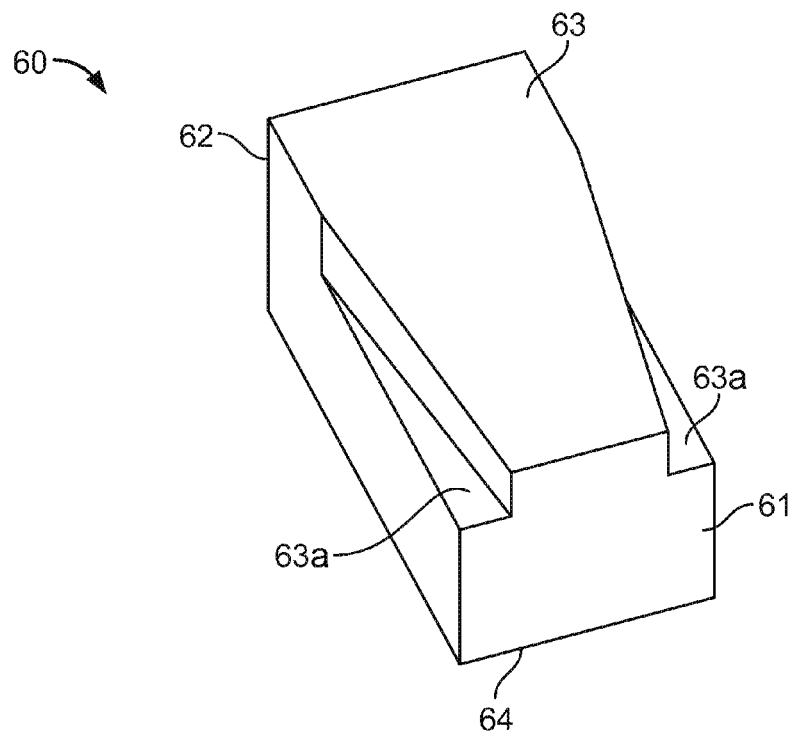
FIG. 12A is a perspective view of a variant of a magnet for use in embodiments of a motor as disclosed herein, wherein the magnet includes a pie-shaped step at the narrow end on the top.
Figure 12B:
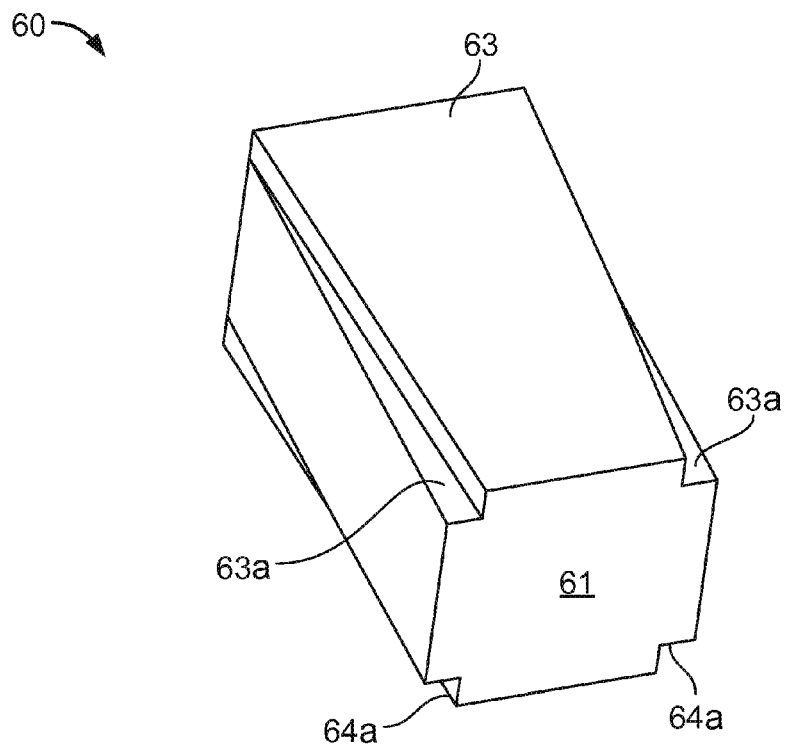
FIG. 12B is a perspective view of another variant of a magnet for use in embodiments of a motor as disclosed herein, wherein the magnet includes two pie-shaped steps at the narrow end on the top and on the bottom, respectively.
Figure 12C:
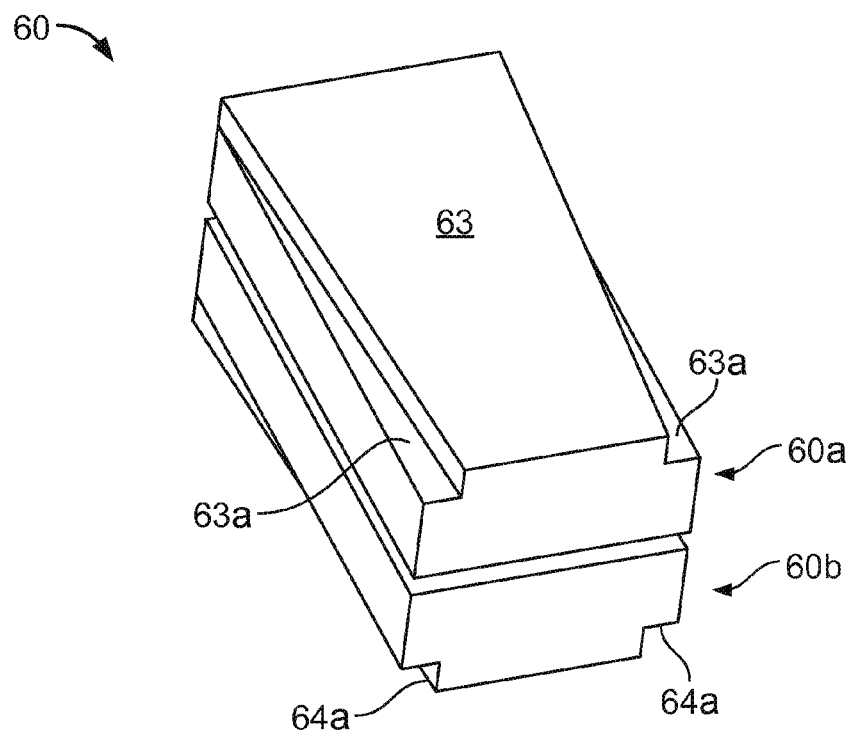
FIG. 12C is a perspective view of another variant of a magnet for use in embodiments of a motor as disclosed herein, wherein the magnet is made up of two pieces stacked one on top of the other, each having pie-shaped steps.

In the embodiment illustrated in FIG. 12A, the magnet 60 includes two pie-shaped steps 63a formed adjacent the top pole face 63 on both sides thereof so that the top pole face 63 is narrower at the inner end 61 than at the outer end 62. The embodiment illustrated in FIG. 12B is different from that of FIG. 12A in that the magnet 60 further includes two pie-shaped steps 64 a formed in the bottom pole face 64 on both sides thereof so that the bottom pole face 64 is also narrower at the inner end 61 than at the outer end 62. The embodiment illustrated in FIG. 12C is different from that of FIG. 12B in that the magnet 60 is made up of two halves 60a and 60b stacked one on top of the other. The two halves 60a and 60b attract each other and help hold each other in place in the rotor 50. In the embodiment illustrated in FIG. 12D, there are four angled peripheral edges 63b adjacent the top pole face 63 and there are four angled peripheral edges 64b adjacent the bottom pole face 64. The top pole face 63 and the bottom pole face 64 are narrower at the inner end 61 than at the outer end 62.

The purpose of the above configurations is to focus the lines of magnetic force or the magnetic flux. The magnet 60 is a good flux conductor. The wide portion of the magnet 60 disposed between the two pole faces 63 and 64 creates more lines of force. The narrow magnet or magnet material on the top surface and/or bottom surfaces 63 and 64, at the poles, causes the lines of force to constrict and focus to a higher concentration at the narrower pole surface(s).

The stepped configuration as illustrated in FIG. 12A reduces the area of the top surface 63 or pole face as compared to other portion of the magnet 60. Accordingly, this configuration helps concentrate the magnetic fields and increase the field strength at the narrowed top surface 63 functioning as a pole end. Therefore, the configuration of FIG. 12A may be desirable when the magnet 60 is embodied in an end rotor disposed at the outermost end, with a stator on one side only.

Figure 12D:
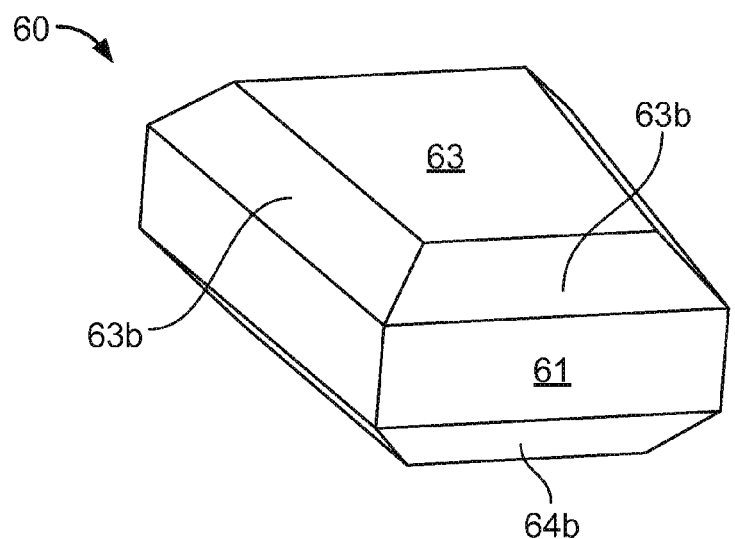
FIG. 12D is a perspective view of another variant of a magnet for use in embodiments of a motor as disclosed herein with angled surface.

The stepped configuration as illustrated in FIGS. 12B and 12C or the angled configuration as illustrated in FIG. 12D reduces both the areas of the top pole face 63 and the bottom pole face 64 as compared to other portion of the magnet 60. Accordingly, this configuration helps concentrate the magnetic fields and increase the field strength at the narrowed bottom surface 64 as well as at the narrowed top surface 63, both functioning as pole ends. Therefore, the configurations of FIG. 12B through 12D may be desirable when the magnet 60 is embodied in a middle rotor interposed between stators.

In some embodiments a desirable magnet shape includes a pole area which is narrower than a middle portion. In any of the embodiments, the magnet 60 need not be a solid magnet. The magnet 60 can be built from any number of smaller or thinner magnet pieces stacked so as to make the composite final shape. A stepped or angled configuration may be obtained by machining the magnet 60 or by casting.

The magnets 60 may be of any shape. In some embodiments, the magnets 60 include two parallel, flat surfaces (pole faces) that face the stator 20. The polarities of the magnets 60 may be north-south-north-south in alternating configurations. This translates to a design using always an even number of magnets 60. In some embodiments the width of the closest point between magnets 60 is equal to the width of the widest part of the magnets 60, though closer and farther configurations may be provided in various embodiments. In various embodiments, the magnets may be shaped as cylinders or discs, prismatic squares or rectangles, and/or prismatic pie-shapes truncated with inner and outer arcs.

Figure 13:
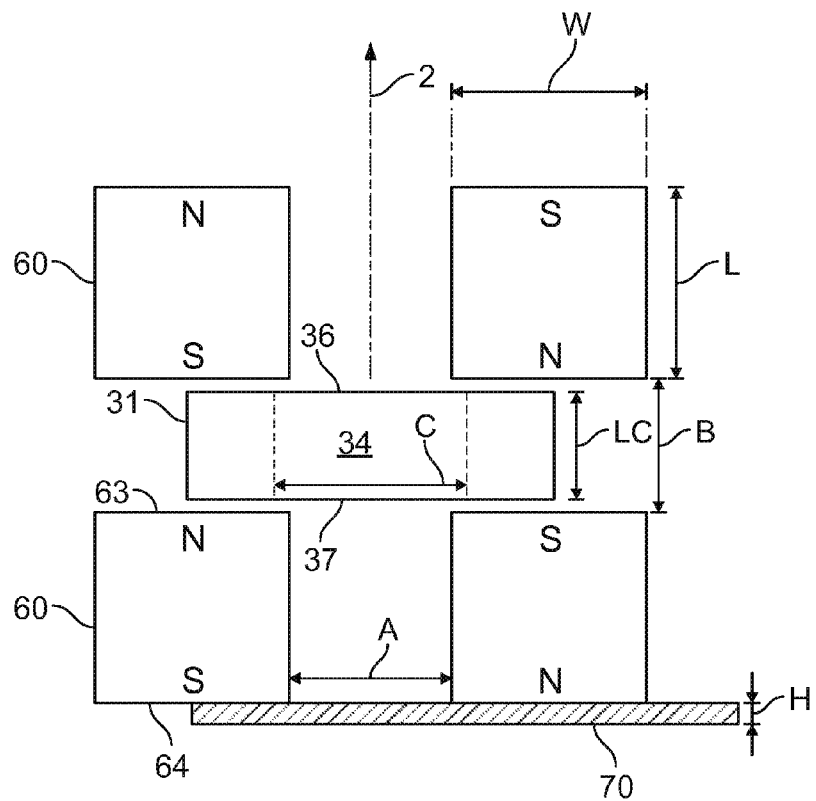
FIG. 13 shows design rules for an embodiment of an electric motor as disclosed herein.
Figure 13:
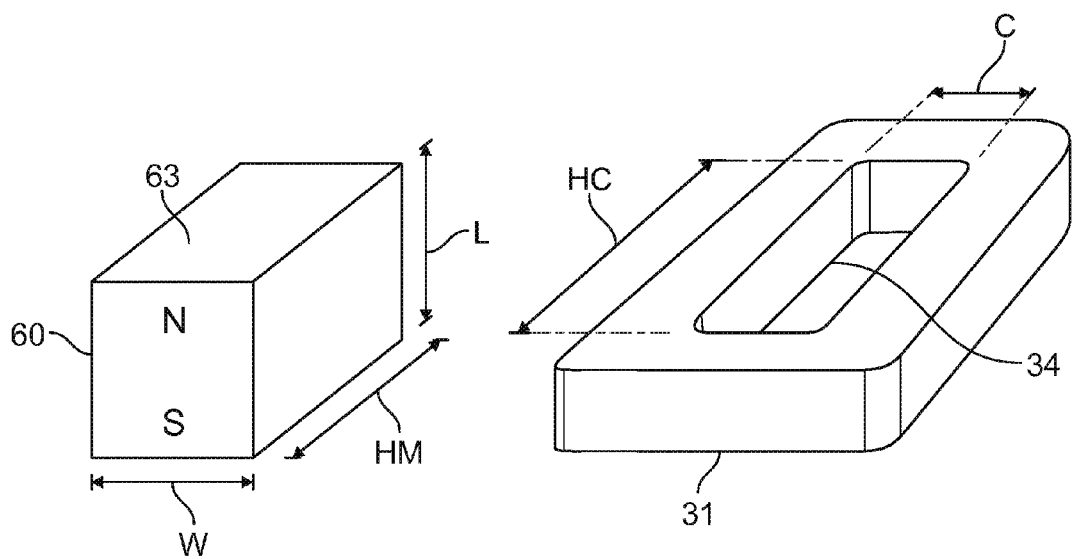

FIG. 13 illustrates design rules for an embodiment of an electric motor as disclosed herein. The magnet 60 has a width W, a length L, and a height HM. The length L is a dimension of the magnet 60 measured between the pole faces 63 and 64. The core 34 has a width C, a length LC, and a height HC. The length B is a dimension of the core 34 measured between the pole faces 36 and 37. A magnet interval as measured between adjacent magnets 60 arranged in the same rotor 50 is denoted as A. A magnet gap between magnets 60 arranged in adjacent rotors 50 as measured along the direction of the axis 2 is denoted as B. The shunt plate includes a thickness H.

An embodiment of a design rule for an electric motor as disclosed herein is as follow:

$W \leq A$, optimally $W = A$
$L \geq A$, optimally $L > A$
$B \leq A$
$C \geq W$, optimally $C = W$
$L > B$
$HM \geq C$ In addition, LC may desirably be as close to B as possible so that a gap between the coil 31 and the magnet 60 measured along the direction of the axis 2 can be as small as possible. H may desirably be large enough to transfer substantial flux from coil to coil.

As best shown in FIG. 13, magnets 60 may be oriented opposite to each other (north facing south and south facing north) along an axial parallel. Magnets 60 on one rotor 50 may be aligned with magnets 60 on the next rotor 50 in this fashion. On a single rotor 50 around the circle that includes the center of each magnet 60 magnets 60 are arrayed opposite to each other, as also seen FIG. 14.

In some embodiments, the magnets 60 are oriented with the polarized surfaces (pole faces) aligned normal to the rotor axis. In an alternate embodiment, the magnets 60 may be aligned along a radial. This alternative embodiment may include a second concentric array of coils 31, the first coil array centers aligned with the outer ends of the magnets 60 and the second coil array centers aligned with the inner ends of the magnets 60.

In another alternative embodiment, the magnets 60 may be oriented along the direction of the circle described by the centers of the magnets 60, facing north to north or north to south repetitively around the circle.

In other embodiments, the magnets 60 may be oriented facing each other (north facing north and south facing south). In these embodiments, the coil design may be altered by reversing the winding direction at the center of the coil axis as shown in FIG. 6.

Figure 14:
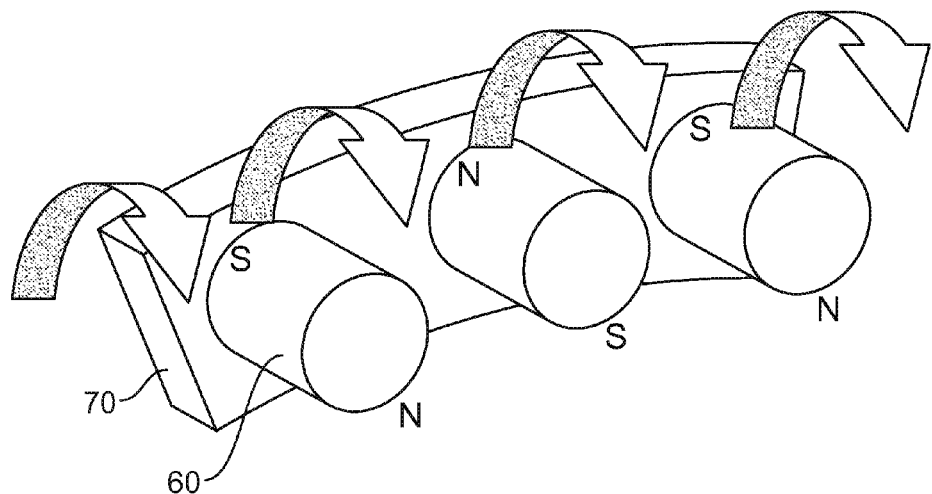
FIG. 14 shows a shunt plate for an embodiment of an electric motor as disclosed herein.

In FIG. 14 is shown an embodiment of a shunt plate 70 which may be included in some embodiments of motors disclosed herein. The shunt plate may provide a flux conduction path from one magnet 60 to the next magnet 60. Half of the flux may be conducted to the right of each magnet 60 and half to the left of each magnet 60 as illustrated in FIG. 14. A shunt plate 70 may be provided on each end of the stator/rotor stack. Additional shunt plates 70 may be provided every so many stator/rotor groups as desired. The shunt plate 70 may be made of one contiguous piece of material or of separate pieces of material as desired.

The above descriptions can be extrapolated to radially-oriented embodiments.

Figure 15:
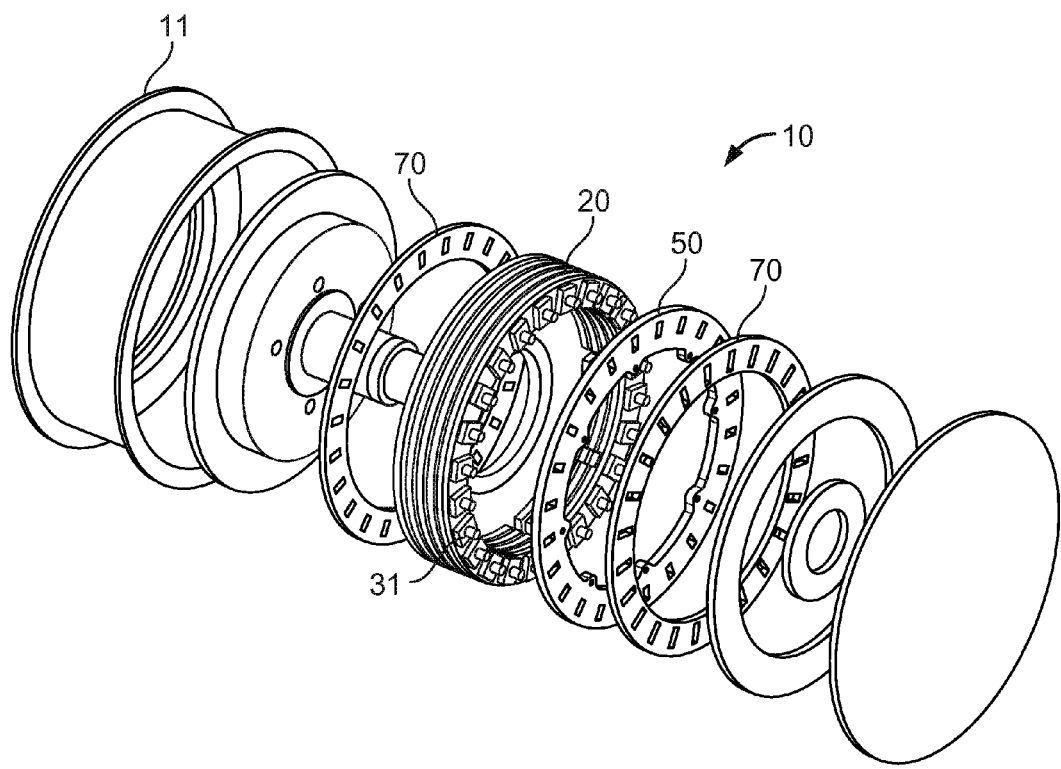
FIG. 15 shows an example of a wheel-and-rim-type hub motor in accordance with an embodiment of the present invention.

FIG. 15 shows an example of a motor 10 according to an embodiment disclosed herein, which is embodied a wheel-and-rim-type hub motor. The motor 10 includes a rim 11, two shunt plates on either end of the stator/rotor stack, a number of stators and rotors, each with coils 31 and magnets 60 in radial arrays, bearings, shafts, and other support components as necessary. This particular design illustrated in FIG. 15 is not modular, except in the sense that each part of the stator/rotor stack may be viewed as a module, however, the design can be implemented with modular components as with all of the high density designs disclosed herein.

As shown in FIGS. 2, 14 and 15, in some embodiments, at each end of the stator-rotor stack, there is a magnetic shunt path or shunt plate 70. The shunt plate 70 may be composed of a material that is able to conduct magnetic flux. The flux from the rotor magnets 60 may close the magnetic flux loop through the shunt plate 70, allowing the flux loop to pass from a south pole to the next north pole to the next south pole, etc as best seen in FIG. 14. Embodiments of the motor 10 can be constructed without one or both shunt plates 70. Performance may be negatively affected without the presence of shunt plates 70. In some embodiments, the shunt plate 70 has cross-sectional area equal to about half the cross-sectional area of one of the magnets 60.

In some embodiments, the shunt plate 70 may be slotted or made up of discrete segments. Each slot or segment interface may be aligned half way between the magnets 60. The slot or interface may induce a convenient sharp change of magnet lines of force which can be used with magnetic sensors, such as Hall Effect devices, to tell the motor controllers when to switch the pulses to the coil 31 from +/- to -/+ between the two coil wires. The same signal can be used as the basis of a start point for a timed delay for the switching of the +/- to -/+ between the two coil wires, assuming that a timing delay (or advance) is desired.

Figure 16:
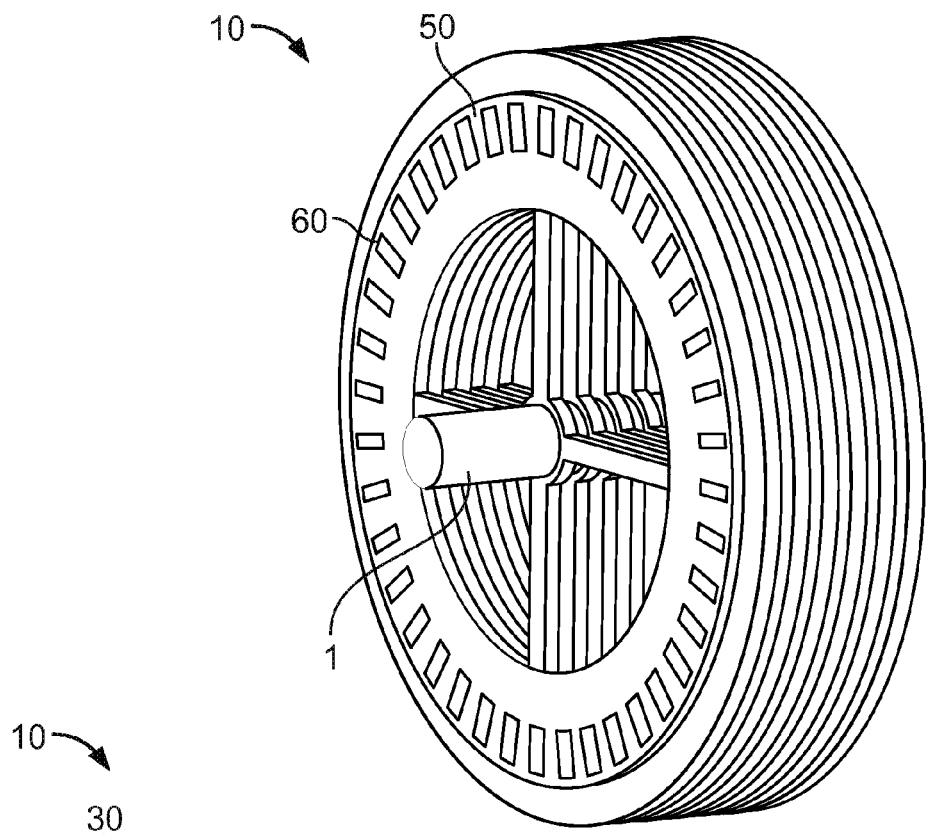
FIG. 16 shows an example of a high density standard configuration motor in accordance with an embodiment of the present invention.

FIG. 16 shows an example of a motor 10 according to an embodiment of the present disclosure, which is embodied as a high density standard motor. A "standard motor" is defined to be a motor with a stationary stator and rotating rotor or stationary group of stators and rotating group of rotators configured in a stator/rotor stack. The standard motor may include one or all of the elements described above: stator(s), rotor(s), coils, permanent magnets, position sensors, coil energizing circuits and/or rectification circuits and design considerations as previously enumerated. In FIG. 16, the rotors 50 contain rectangular magnets 60, and the stators 20 contain rectangular coils 31 and cores 34 (hidden in the stack). The stators 20 are stationary and the rotors 50 turn to drive the central shaft 1.

Figure 17:
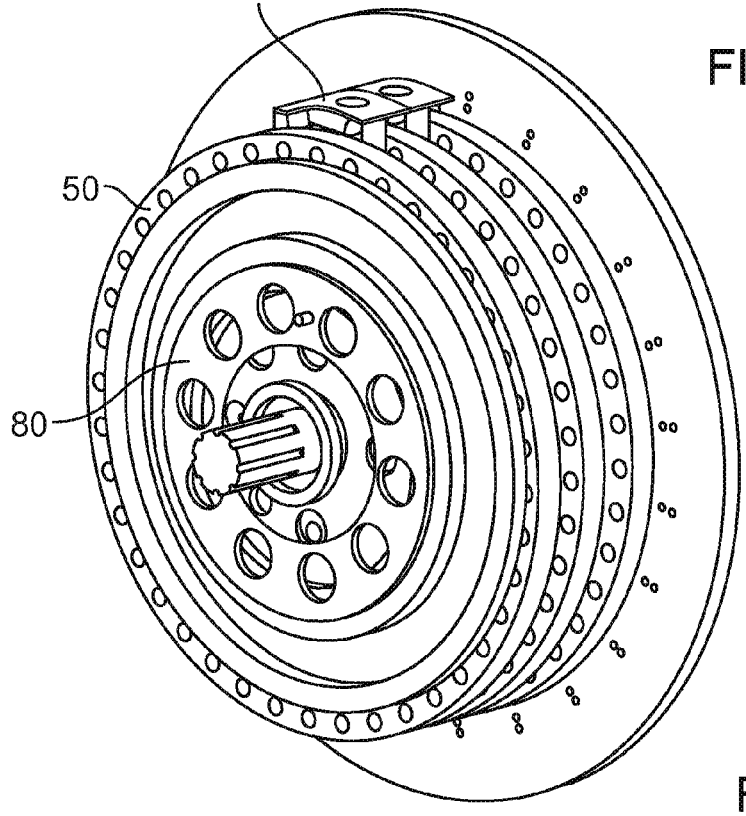
FIG. 17 shows an example of a motor with an epicyclic gear set in accordance with an embodiment of the present invention.
Figure 18:
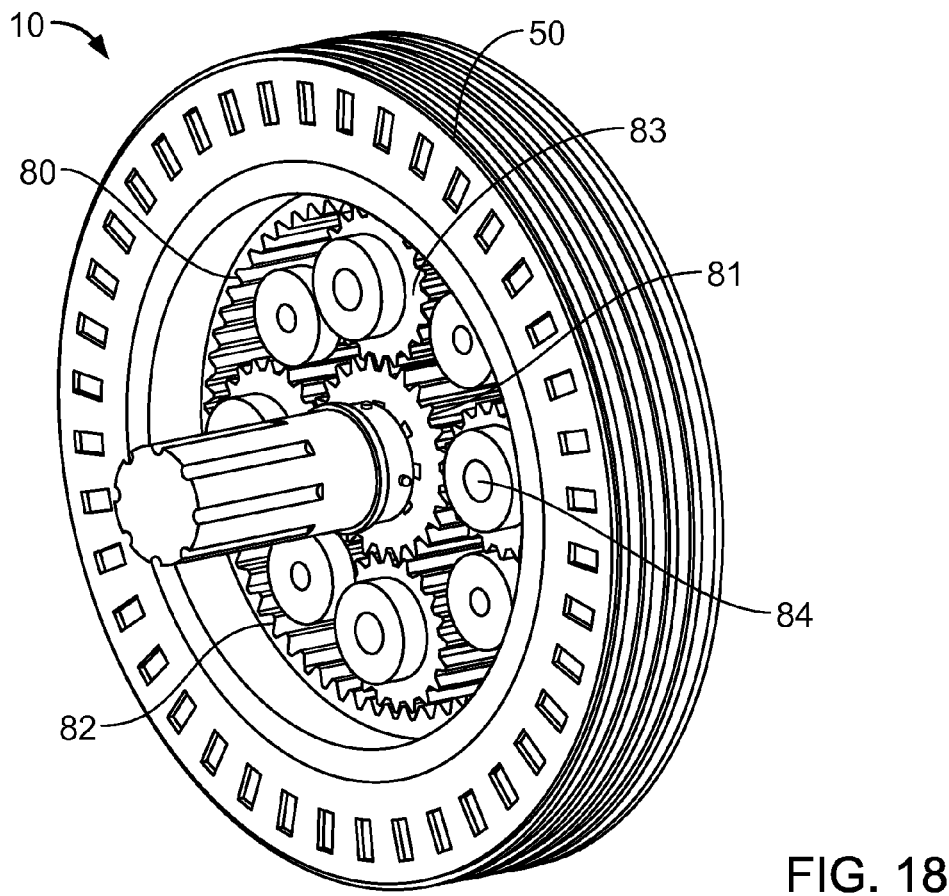
FIG. 18 shows an example of a high density transmission motor in accordance with an embodiment of the present invention.

FIGS. 17 and 18 show examples a motor 10 according to an embodiment of the present disclosure, which is embodied with an epicyclic gear set 80. The configuration of the epicyclic gear set 80 is better seen in FIG. 18. The rotors 50 may be set concentrically outside of the ring gear 82 or side-by-side with the ring gear 82. The method of attachment can vary and the rotor can be indirectly or directly attached to the ring gear 82, either next to or outside of the ring gear 82.

In the epicyclic gear set 80, an input shaft of the motor 10 drives a sun gear 81, a ring gear 82 is driven by motor rotors 50, and the planet gear carrier 84 drives an output shaft. The motor 10 optionally uses a clutch or other locking device to limit or lock the motion of the ring gear 82 (or attached rotor 50) relative to the motor housing (not shown). The rotor 50 may be driven by energy input from the stator 20 such that the speed of the ring gear 82 may be controlled relative to or different than the speed of the input shaft, resulting in an ability to alter the gearing ratio relative to the output shaft. This gear ratio, based on energy added to the ring gear 82 from the driven rotor 50, results in a variable input to output shaft speed infinitely variable ratio from 1:1 to the ratio of the epicyclic gear set 80. Unlike a regular mechanical transmission, the electric variable transmission adds torque through one or more stator/rotor sections. In the embodiment illustrated in FIG. 17, three rotors 50 drive two stators 20 around the central epicyclic gear set 80. The two stators 20 would contain 24 encapsulated coil modules 30 each, however, only one encapsulated coil module 30 per stator is shown.

In the embodiment illustrated in FIG. 18, the same epicyclic gear set 80 as used in FIG. 17 is used. A difference between the two embodiments shown in FIGS. 17 and 18 is the width of the stator and rotor sections. The width of the stator and rotor sections of FIG. 17 is thicker than the width of the stator and rotor sections of FIG. 18. For example, in FIG. 17 each rotor 50 may be 1.5 inches (3.8 cm) thick and each stator/rotor section may be 3 inches (7.6 cm) thick, including the 1.5 inch thick rotor 50 while in FIG. 18 each stator/rotor section may be 0.76 inches (1.9 cm) thick. However, other thicknesses larger or smaller may be used, depending on the desired performance.

Figure 19:
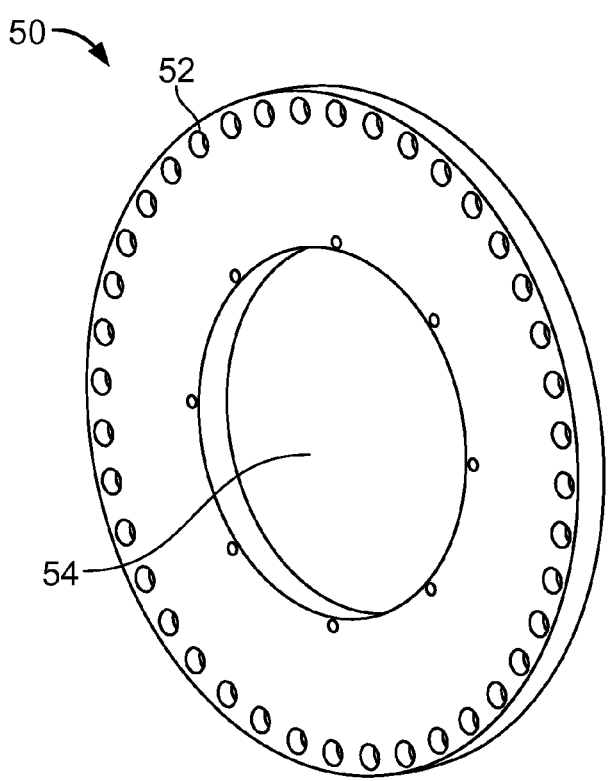
FIG. 19 shows an example of a standard motor rotor in accordance with an embodiment of the present invention.

FIG. 19 shows an example of a rotor 50 of a motor 10 according to an embodiment of the present disclosure, which is embodied as a standard motor rotor. In this embodiment, the rotor 50 includes 40 magnet holes 52 evenly spaced near the outer periphery of the rotor 50. In this embodiment, the rotor 50 includes a center hole 54 in the center of the rotor 50 as might be used in a transmission application. In a non-transmission standard motor application the center hole 54 may be much smaller than shown, as desired to attach to either a shaft, a shaft collar, or other shaft attachment system. The rotor 50 may be designed with any even number of magnet holes 52, each of which may be of a similar shape in a radial array. The magnets 60 may be round, square, pie shaped, rectangular, or any other convenient shape, for example, the truncated pie shape as best seen in FIG. 2.

Figure 20:
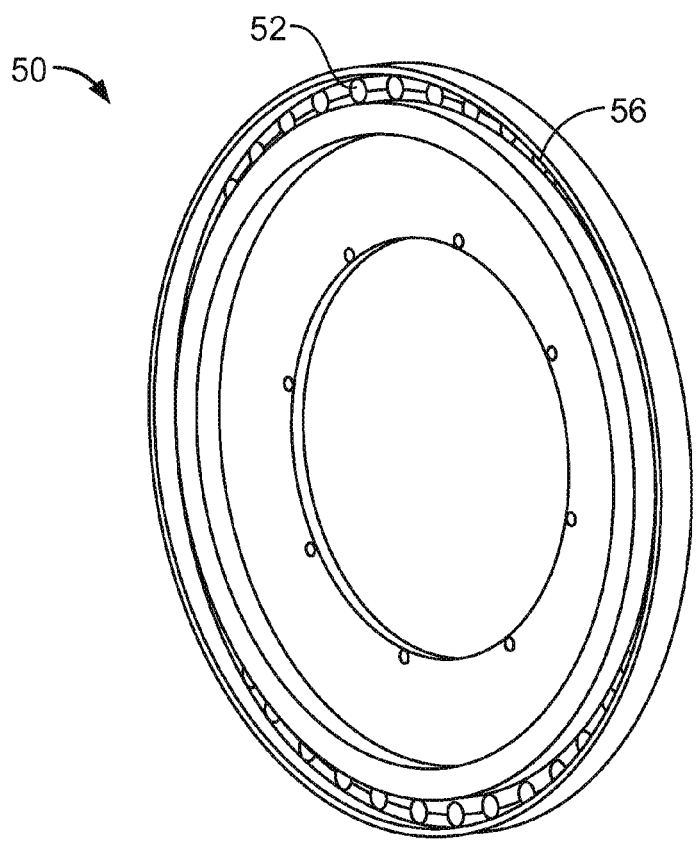
FIG. 20 shows another example of a standard motor rotor in accordance with an embodiment of the present invention.

FIG. 20 shows another example of a rotor 50 of a motor 10 according to an embodiment of the present disclosure, which is embodied as a standard motor rotor. In this embodiment, the rotor 50 includes a circular pocket 56 for receiving the shunt plate 70 (not shown in FIG. 20), which may increase motor efficiency by providing a magnetic flux conduction path for each magnet 60 to conduct half of its flux to the next magnet 60 in the radial array on either side. The rotor 50 on each end of the stator/rotor stack may be configured with the circular pocket 56 for the shunt plate 70, which may be designed with a magnetically conductive material.

Figure 21:
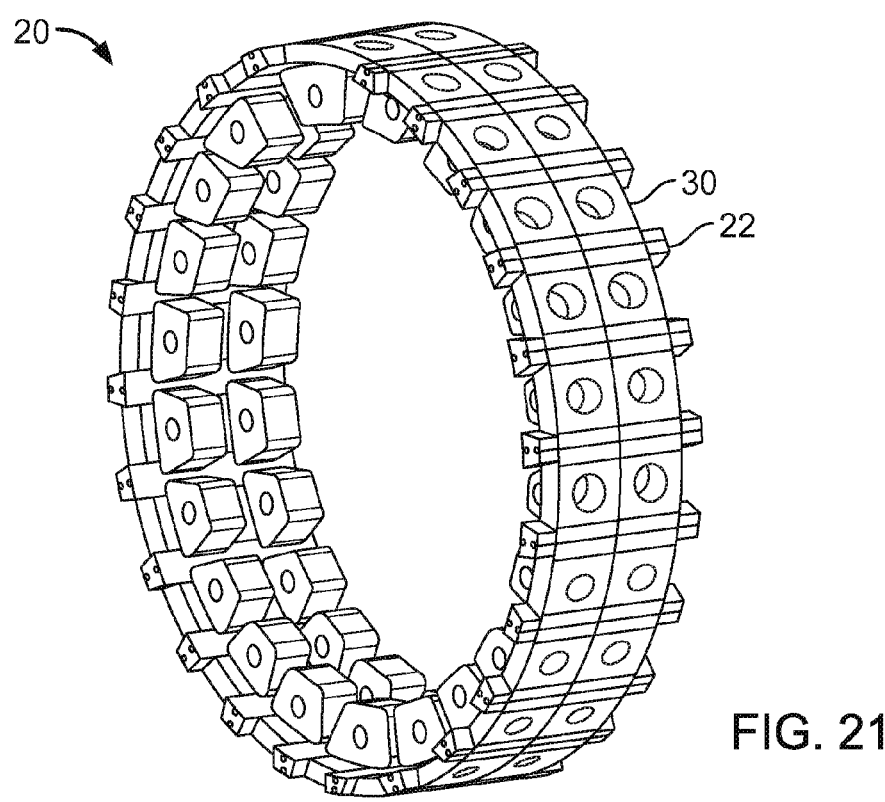
FIG. 21 shows an example of a stator of a motor in accordance with an embodiment of the present invention.
Figure 22:
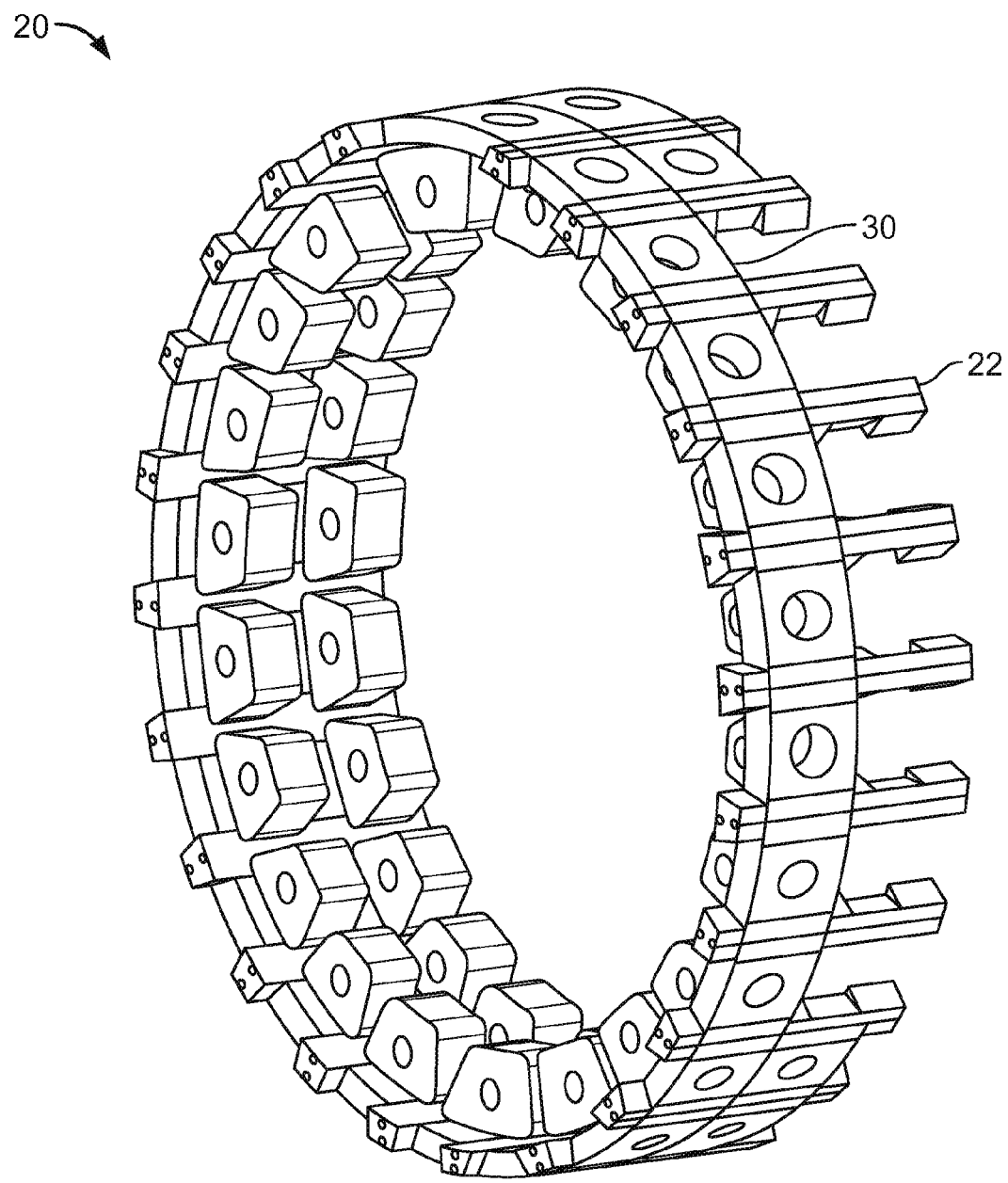
FIG. 22 shows the stator of FIG. 21, with some coil modules omitted for clarity.

FIGS. 21 and 22 show an example of a stator 20 of a motor 10 according to an embodiment of the present disclosure. In FIG. 21, there are two stators 20, each composed of a radial array of encapsulated coil modules 30 and support arms 22 as might be used in a modular design. Each radial array of encapsulated coil modules 30 represents a stator section. In FIG. 22, some of the encapsulated coil modules 30 in one of the two stators 20 are omitted for the illustration purpose.

Figure 23:
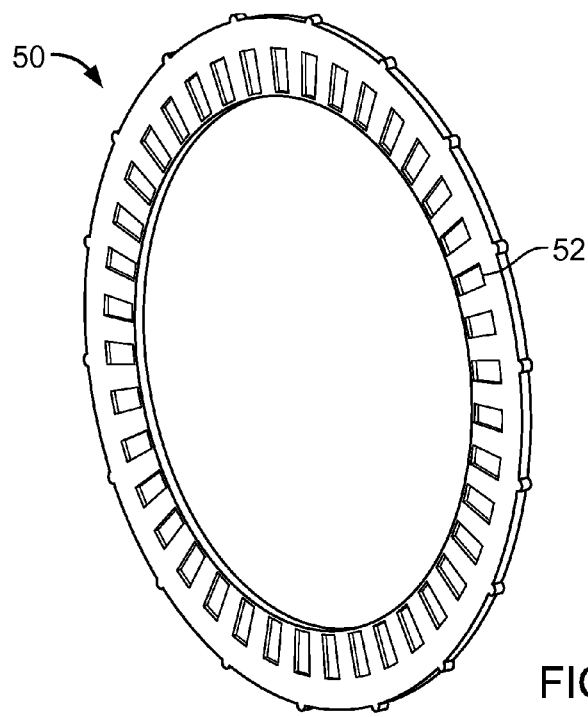
FIG. 23 shows another example of a rotor of a hub motor in accordance with an embodiment of the present invention.

FIG. 23 shows another example of a rotor 50 a motor 10 according to an embodiment of the present disclosure, which is embodied as a hub motor. In this embodiment, the rotor 50 of the hub motor 10 is shown such as may be used in an automotive type application.

Figure 24:
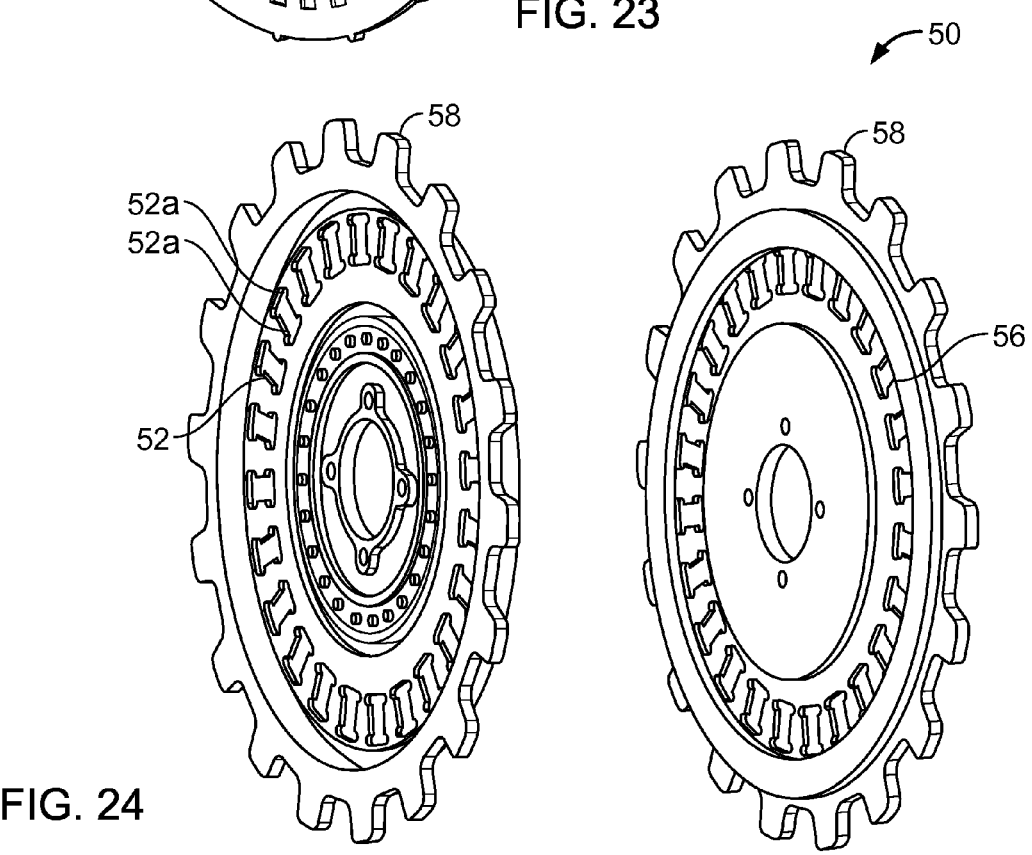
FIG. 24 shows another example of a rotor of a hub motor in accordance with an embodiment of the present invention.

FIG. 24 shows another example of a rotor 50 of a motor 10 according to an embodiment of the present disclosure, which is also embodied as a hub motor. In this embodiment, the rotor 50 of the hub motor 10 is shown as a sprocket rotor with teeth 58. In the view on the left, the rotor 50 shows magnet holes 52 for rectangular magnets 60 (not shown). The extra half circles 52*a* in the four corners of each magnet hole 52 may be used for convenience in a particular manufacturing process, but these half circles 52*a* are not necessary for the design to be functional. In the view on the right, the rotor 50 shows a shunt pocket 56 for the shunt plate 70 (not shown).

Figure 25:
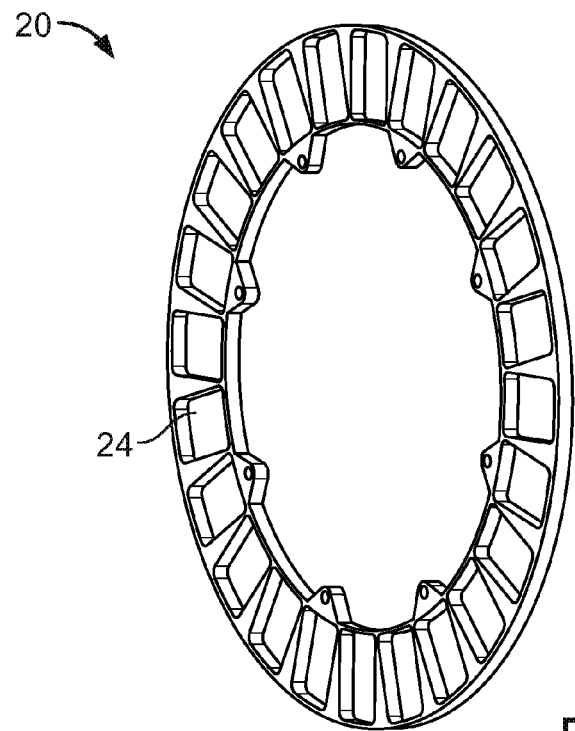
FIG. 25 shows another example of a stator of a hub motor in accordance with an embodiment of the present invention.

FIG. 25 shows another example of a stator 20 of a motor 10 according to an embodiment of the present disclosure, which is embodied as a hub motor. In FIG. 25, internal rectangular holes 24 for receiving coil modules 30 (not shown) are shown for illustration.

Figure 26:
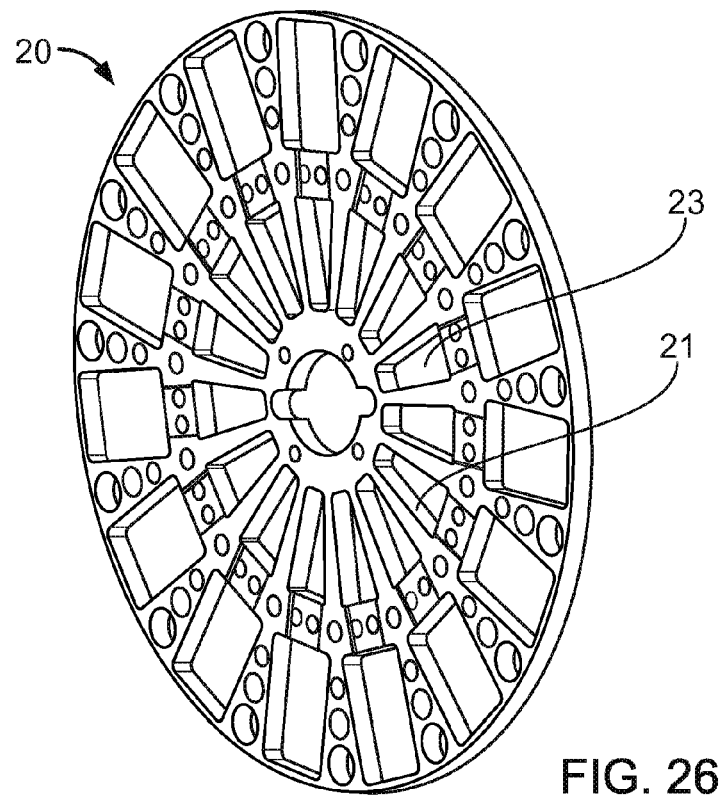
FIG. 26 shows another example of a stator of a motor with spokes in accordance with an embodiment of the present invention.

FIG. 26 shows another example of a stator 20 of a motor 10 according to an embodiment of the present disclosure. In this embodiment, the stator 20 includes spokes 21. The extra holes 23 reduce the weight of the stator 20.

In a motor embodiment, a circuit that controls the timing of the pulses switches (or fires) the pulses at the right orientation of the coil 31 relative to the magnet 60 for optimal motor performance. The timing of the switching may be controlled in a variety of ways, including but not limited to brushes, sensing of the magnet position through one or more coils, the use of a Hall effect device, or optical sensors.

As timing is advanced too far, the coil 31 may push or pull the magnets 60 with a net force opposite to the desired direction of motion of the motor 10. This reduces performance and wastes power. The same is true is the timing is retarded too far.

Generator embodiments that rely only on rectification do not need to sense relative magnet/coil relative orientation. Coil/coil based induction generators may desirably sense this relative orientation.

Embodiments of a regenerative motor according to the present invention can be designed with a variety of phases. Each phase may utilize independent timing of electrical pulses. A series of coils may be located such that the first coil 31 fires, then the second, then the third, etc. until three coils 31 have fired in a 3-phase motor or four coils 31 have fired in a 4-phase motor, etc. Once the number of coils 31 matching the number of phases of the motor 10 includes been reached, the next coils 31 in the series may be fired at the same time as the individual coils 31 correspond to the first coils 31 in the repeating series. For example, in a 3-phase motor with 9 coils, coils 1, 4, 7 fire first, the coils 2, 5, 8 fire, and finally coils 3, 6, 9 fire, after which the process repeats.

The number of phases may be determined in the design process by determining or selecting the number of magnets 60 and coils 31. The angles between the magnets 60 and/or coils 31 may be used determine the number of phases. Charts or tables may be developed to simplify the process, such as the chart shown in FIG. 27. FIG. 27 shows a table of the number of phases at a given ratio of magnets 60 to coils 31. This table can be used as a look up table to determine the number of phases that a given motor or generator design will have at a given ratio.

Depending on the type of stator and rotor arrays of magnets relative to coils (or coils relative to coils), each coil 31 may interact with four magnets 60 at a time, two on either side of the coil as can be seen in FIG. 13 (as long as there is an opposing rotor 50 on each side of the coil 31—in embodiments where a coil 31 does not have a rotor 50 on both sides the coil 31 may interact with half the number of magnets 60 at a time). In embodiments with concentric arrays of magnets 60 and coils 31 or side-by-side linear arrays of the same, an individual coil may interact with a greater number of magnets 60.

Figure 28:
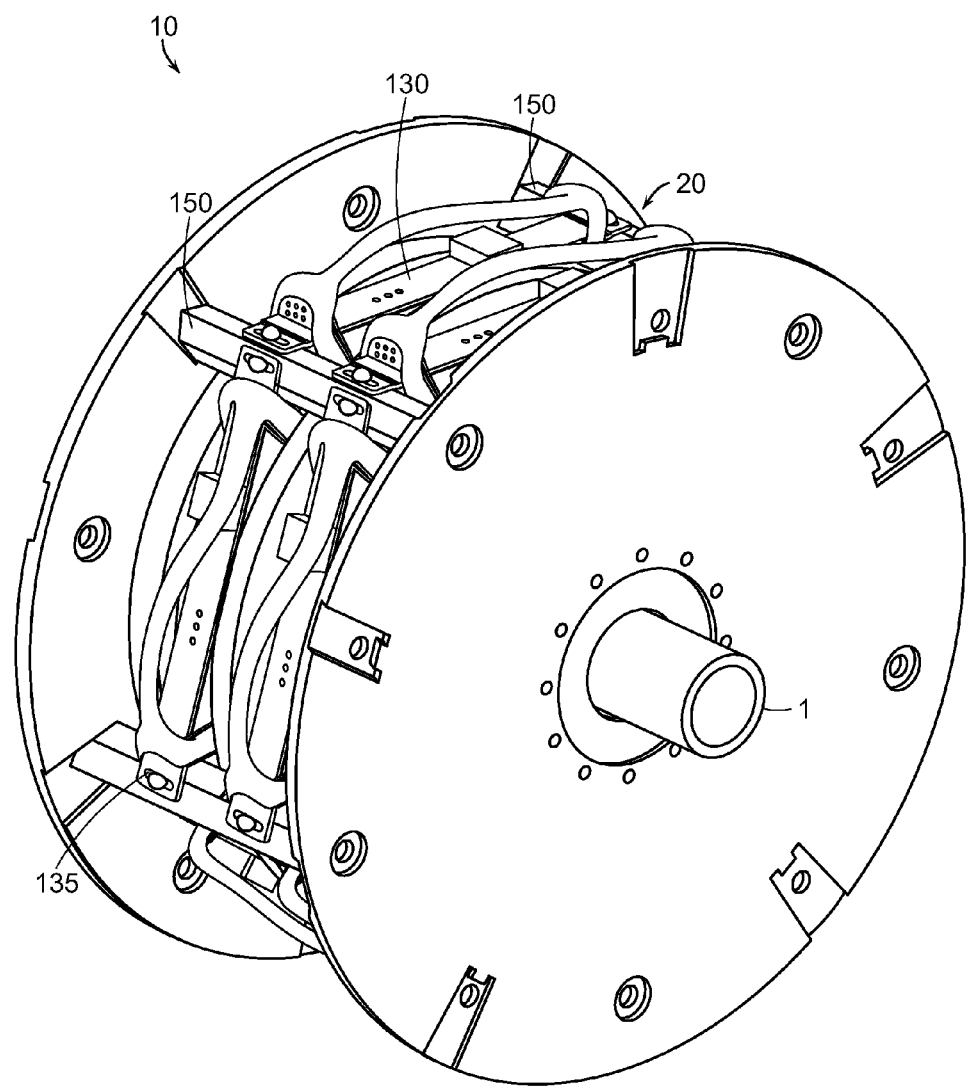
FIG. 28 is a perspective view of an embodiment of a motor according to an embodiment of the present invention.
Figure 29:
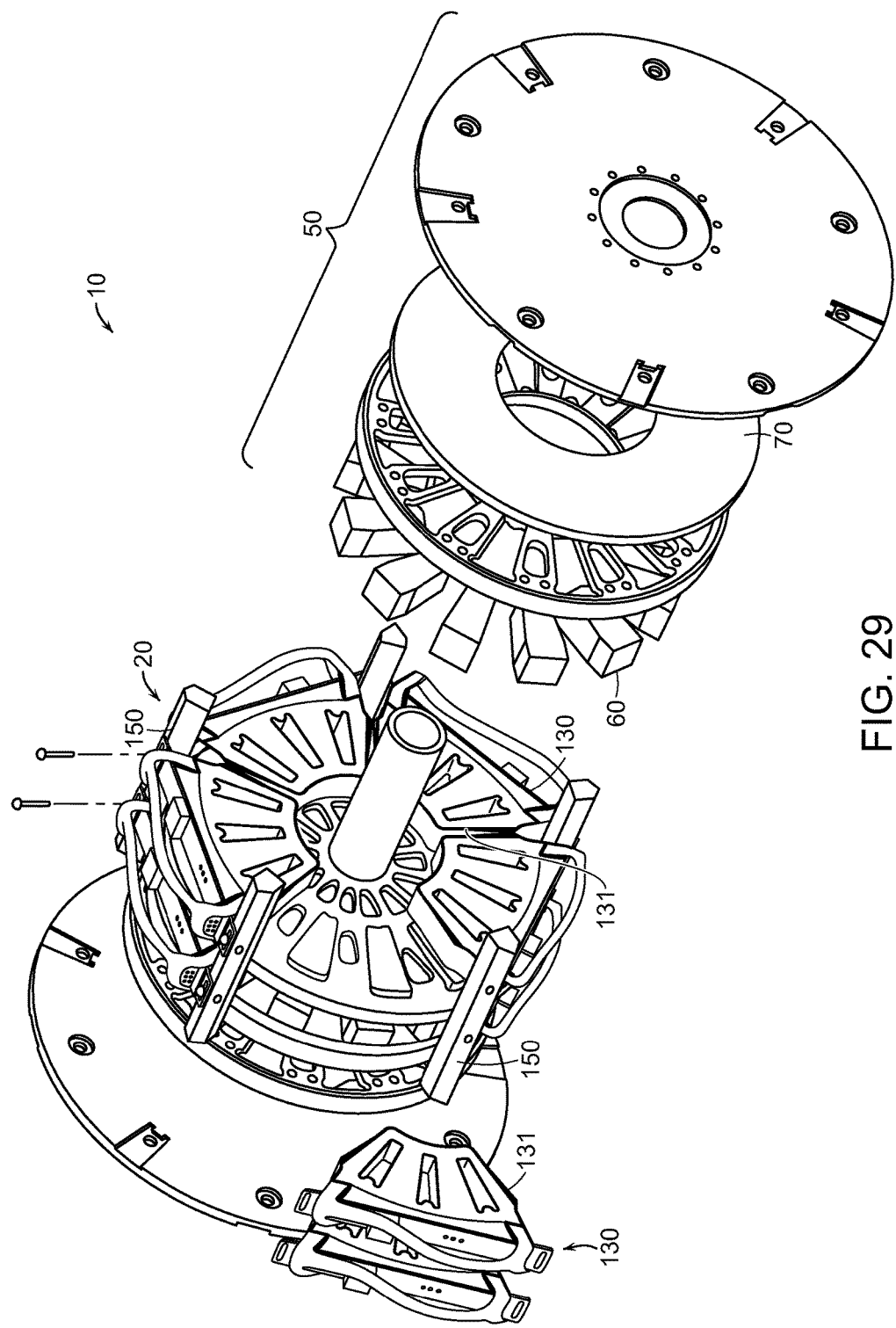
FIG. 29 is a partially exploded view of the motor of FIG. 29.
Figure 30A:
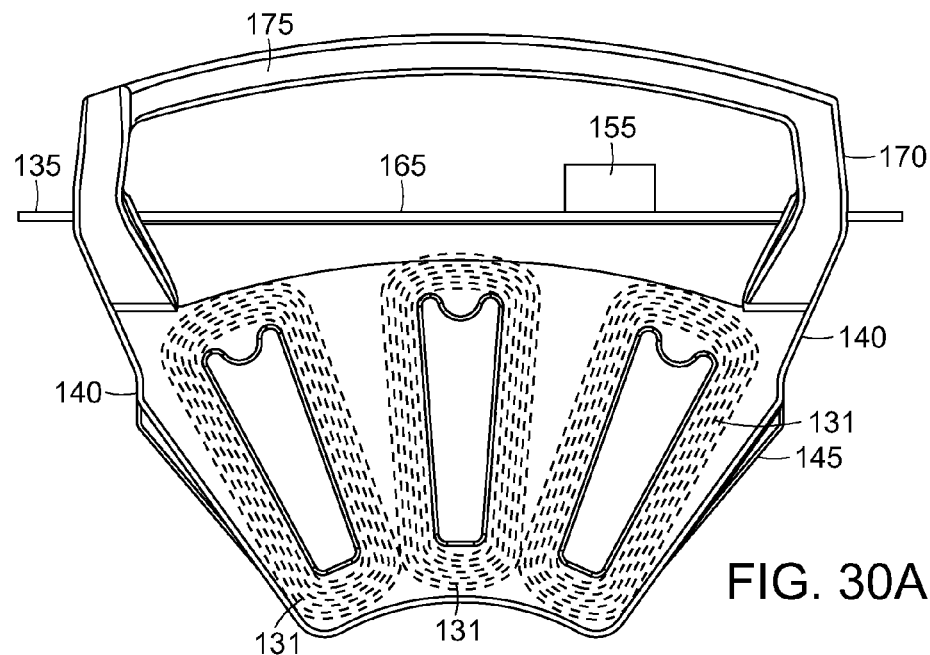
FIG. 30A is an elevational view of the coil module of the stator of the motor of FIG. 28.
Figure 30B:
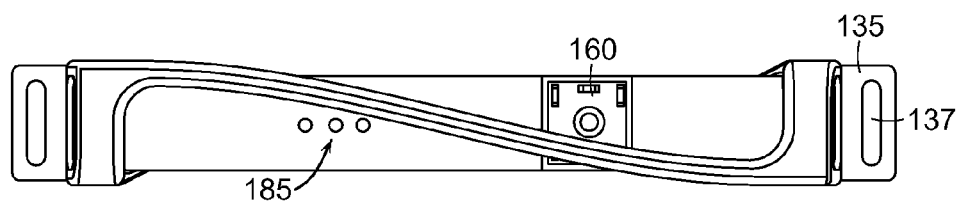
FIG. 30B is a plan view of the coil module of FIG. 30A.
Figure 30C:
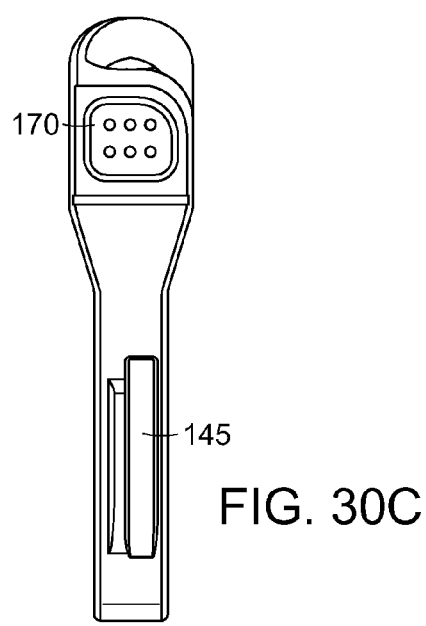
FIG. 30C is an elevational view from the side of the coil module of FIG. 30A.

In another embodiment of an electric motor 10, illustrated in FIGS. 28 and 29, the motor 10 may include one or more coil modules 130 including a plurality of coils 131. The coils 131 may be arranged in a common (or substantially common) plane horizontally displaced from one another. Here, "horizontally displaced" refers to being displaced in a direction normal to the axis of the cores of the coils and/or in a plane defined by faces of the coils. Embodiments of the coil modules 130 may include three coils or more or fewer than three coils. The coils 131 may be substantially similar to the coils 31 and the variations of the coils 31 disclosed herein may also be present in various embodiments of the coils 131. An example of a 3-coil module 130 is illustrated in FIGS. 30A, 30B, and 30C. In FIG. 30B the plug in module 155 (discussed below) is omitted. The coils 131 may be oblong, having axial lengths greater than their widths. For example, a length of a coil in a direction normal to the axis of the core of the coil and extending from a portion of a coil module which would be proximate to the center of a motor when installed in the motor may be greater than a width of the coil in a direction normal to both the axis of the core of the coil and to the length direction of the coil. The coils 131 may be positioned within the coil module 130 with axes defined by the axial extent of each coil angled with respect to each other coil.

In some embodiments, the coils of the coil modules may be arranged to produce multi-phase alternating electrical current responsive to motion of the stator of the motor. The number of phases may be determined in the design process by determining or selecting the number of magnets 60 and/or coils 131. The angles between the magnets 60 and/or coils 131 may be used determine the number of phases. Charts or tables may be developed to simplify the process, such as the chart shown in FIG. 27. FIG. 27 shows a table of the number of phases at a given ratio of magnets 60 to coils 131. This table can be used as a look up table to determine the number of phases that a given motor or generator design will have at a given ratio.

The coils 131 may be formed of any conductive material, for example, copper wire, nanotube wire, carbon nanofibers, or other one or more types of conductive material. The coils 131 may be retained in place relative to another coil by a matrix material forming the body of the coil module 130. The matrix material may form a hermetic seal about the coils 131. The matrix material may include, for example, epoxy or a polyester material and may include strengthening elements, for example, glass fibers or carbon fibers, and may include an additive to enhance the thermal conductivity of the matrix, for example a carbon powder, a metallic powder, or other materials. The cores of the coils 131 may be empty, partially or fully filled with air, or partially or fully filled with matrix material or another material.

Figure 31:
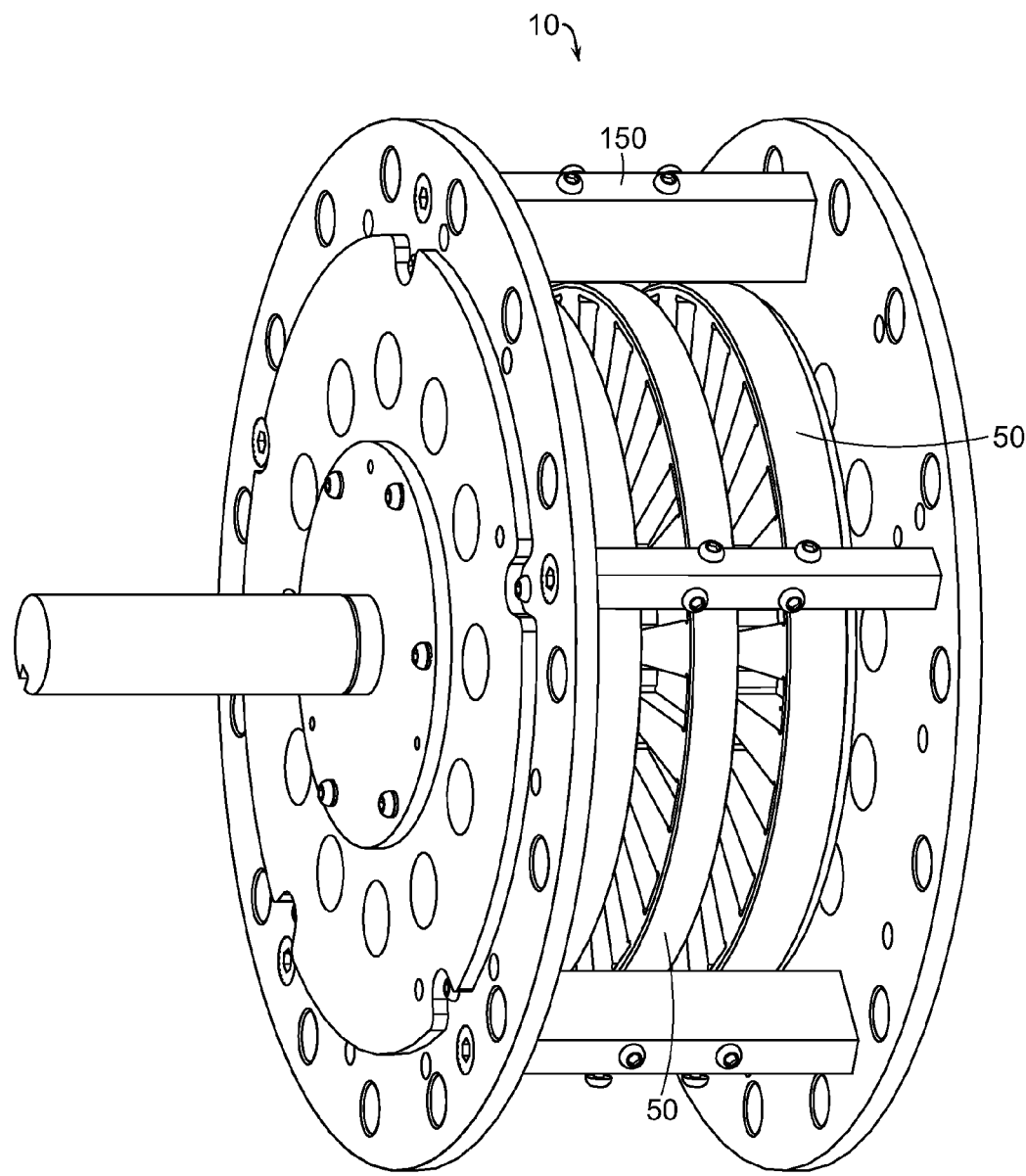
FIG. 31 is a perspective view an embodiment of a motor according to an embodiment of the present invention with magnets and coil modules omitted.

One or more of the coil modules 130 may be inserted between rotors 50 of the motor 10 to form a stator 20. A plurality of coil modules 130 may be inserted between a pair of rotors 50. Each coil module 130 may be connected to another coil module 130. A plurality of coil modules 130 may contact one another to form a stator "disc" or a portion of a stator "disc." In some embodiments, for example, as illustrated in FIGS. 28 and 29, a stator "disc" may include a total of fifteen coils 131. The motor 10 may be provided with five coil modules 130 each including three coils 130 to form a stator disc between a pair of rotors 50. In alternative embodiments, a motor may include a greater or fewer number of coil modules 130 than illustrated in FIGS. 28 and 29. In another example, the embodiment of the motor 10 illustrated in FIG. 31, in which the magnets 60 and coils have not been installed, may accommodate five coil modules 130 with three coils each per stator 20. The motor 10 of FIG. 31 could accommodate two stators, and thus 10 coil modules 130 including three coils 131 per coil module 130.

In some embodiments, the coil modules 130 may include flanges or brackets 135 on upper portions of opposite sides 140 of the coil modules 130. The flanges 135 may include an orifice 137 through which one or more fasteners, for example, a bolt, screw, pin, or other fastener or fasteners known in the art may pass to secure the flanges or brackets 135, and by extension, the coil modules 130 to mounting rods 150 of the motor 10. In some embodiments, the coil modules 130 may include one or more ridges or slots 145 on their sides 140. These ridges or slots 145 may engage complementary ridges or slots 145 on adjacent coil modules 130 when installed in a motor 10 and may facilitate retaining the coil modules 130 in place, reducing vibration of the coil modules 130, and/or increasing the mechanical strength of a stator 20 formed from a plurality of coil modules 130.

A plug-in module 155 may be utilized in conjunction with embodiments of a coil module 130. The plug in module 155 may removably plug in to a socket 160 on the outer edge surface 165 of the coil module 130. Embodiments of the plug-in module 155 may be provided with, for example, five male connectors which engage five corresponding female connectors in the socket 160, although different numbers and/or forms of connectors may be provided in different embodiments. Embodiments of the plug-in module 155 may be provided in different varieties. One variety of the plug-in module 155 may include circuitry configured to provide for the coil module 130, when operating as a generator, to output alternating current. Another variety of the plug-in module 155 may include circuitry configured to provide for the coil module 130, when operating as a generator, to output direct current. When the coil module 130 is utilized as a driver for the motor, either variety of the plug-in module 155 may be utilized.

Figure 32A:
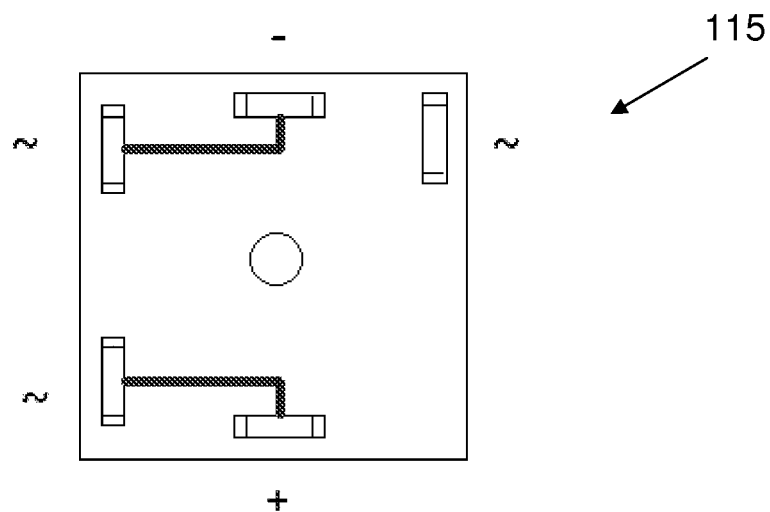
FIG. 32A is an illustration of a plug-in module utililized with some embodiments of a coil module as disclosed herein and illustrating electrical connections within the plug-in module.
Figure 32B:
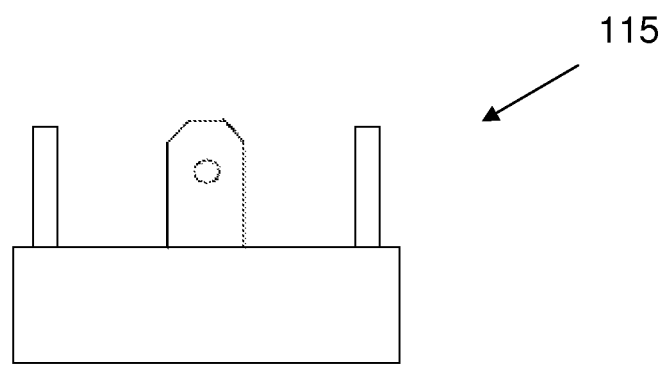
FIG. 32B is an elevational view of the plug-in module of FIG. 32A.

An example of a plug-in module 155 which is configured to provide for the coil module 130, when operating as a generator, to output direct current may include a multi-phase bridge rectifier, for example, one of the multi-phase bridge rectifiers available from Vishay Semiconductors. A wiring diagram of an example of a plug-in module 155 which is configured to provide for the coil module 130, when operating as a generator, to output alternating current is illustrated in FIG. 32A. FIG. 32B illustrates examples of connectors which may be included in embodiments of the plug-in module 155 which may electrically couple to corresponding connectors in the socket 160. The multi-phase rectifier may be replaced with an plugin module of similar physical dimensions and connector arrangement (as the multi-phase rectifier), wherein the module is wired to bypass internal conductors so as to allow AC electrical power to pass to the module output connector.

Electrical power produced in the coil module 130 when operated as a generator may be output through an electrical connector 170 located on an upper portion of the coil module. The electrical connector may include, for example, six pins or other forms of electrical contacts to provide for the coil module to output 3-phase alternating current. When the coil module is operated as a generator to produce direct current, for example, when a direct current plug-in module 155 is inserted into the socket 160, only two of the six pins of the electrical connector 170 may be utilized, one for negative voltage and the other for positive voltage. The electrical connector 170 may be, for example, one of the connectors available from Molex.

Figure 33:
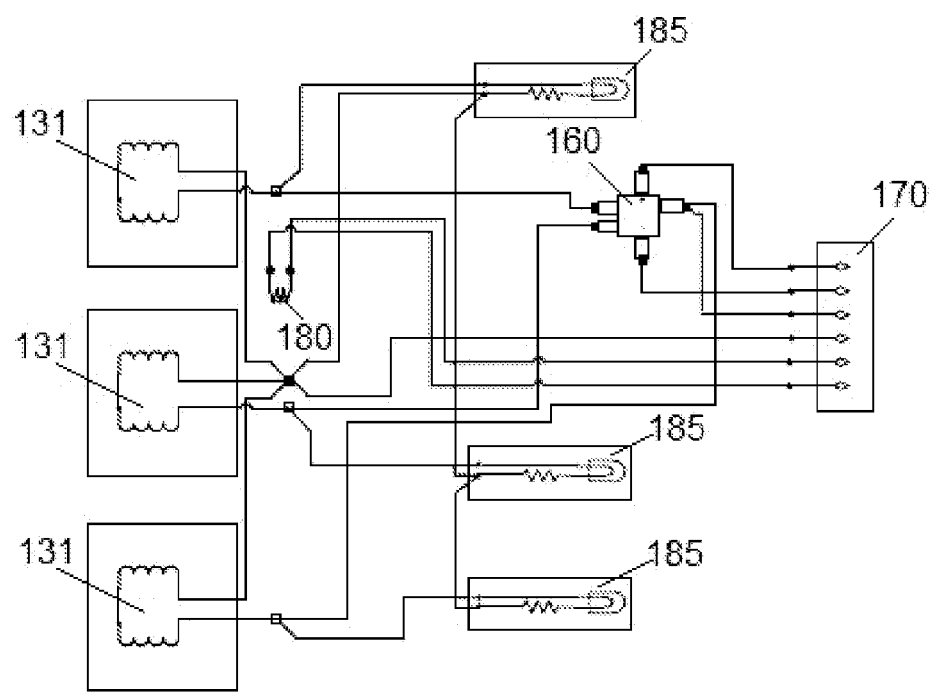
FIG. 33 is a circuit diagram of an embodiment of a coil module as disclosed herein.

Embodiments of the coil module 130 may include additional features. For example, embodiments of the coil module 130 may include a handle 175, which may facilitate insertion and/or removal of the coil module 130 from a motor 10. Embodiments of the coil module may also include one or more thermal sensors 180, for example, thermocouples or thermistors. The thermal sensors may provide an output signal, for example, through pins of the connector 170 which may be used to monitor the operation of the coils 131 of the coil module 130 and facilitate providing an indication of a fault or a warning should one or more of the coils 131 reach a temperature above a desired operating temperature. Embodiments of the coil module may also include one or more indicators 185 which provide information regarding the state of operation of the coils 131 of the coil module 130. These indicators may include, for example, LEDs which may illuminate when the coils 131 are active, for example receiving energy through the connector 170 to drive the motor 10, or receiving energy from the magnets 60 due to the rotation of the motor 10. In some embodiments, each coil 131 is provided with a separate indicator LED 185. The LEDs 185 may illuminate responsive to activation of corresponding coils 131 and may change color or de-illuminate responsive to deactivation or failure of a corresponding coil 131. A circuit diagram of a coil module 130 illustrating these features is shown in FIG. 33. This circuit diagram illustrates how each coil 131 is coupled to its own LED indicator 185 and to the socket 160 and connector 170.

In some embodiments, a motor 10 which may accommodate a certain maximum number of coil modules 130 may operate with less than the maximum number of coil modules 130 installed or activated. In some embodiments, a coil module 130 may be activated, deactivated, inserted, or removed from a motor 10 while the motor is in operation. Similarly, embodiments of a motor 10 may operate with one or more individual coils 131 within one or more installed coil modules 130 deactivated or inoperable due to, for example, damage to the conductive material of a coil. Additionally, in some embodiments, some modules could be used to drive one or more rotors of a motor while others are used to generate electrical current from the motion of one or more rotors.

Although illustrated as used in a motor 10 including disc shaped stators, embodiments of the coil module 130 may also be used in other forms of motors, for example, linear drive motors. In some embodiments, the coils 131 of embodiments of the coil module 130 may be oriented substantially or completely parallel to one another. A coil module 130 including parallel coils 131 may be desirable in a linear drive motor.

Embodiments of motors as disclosed herein may be embodied in various types of motors as further explained below.

Embodiment 1: Standard Regenerative Motor

As seen in FIG. 1, for example, a standard motor is a motor with a stationary stator and rotating rotor or stationary group of stators and rotating group of groups configured in a stator-rotor stack. The standard motor may include one or all of the elements described above: stator(s), rotor(s), coils, permanent magnets, position sensors, coil energizing circuits and/or rectification circuits and design considerations as previous enumerated.

Embodiment 2: Standard Layout for Regenerative Motor Modified to Include Epicyclic Gear Set for Infinitely Variable Electric Transmission As seen in FIGS. 17 and 18 for example, a regenerative motor may be modified to include an epicyclic gear set with the input shaft of the motor driving the sun gear, the ring gear driven by motor rotors, and the planet gear carrier driving the output shaft. The motor optionally uses a clutch or other locking device to limit or lock the motion of the ring gear (or attached rotor) relative to the motor housing. The rotors can be set concentrically outside of the ring gear or side-by-side with the ring gear. The method of attachment can vary and the rotor can be indirectly or directly attached to the ring gear, either next to or outside of the ring gear.

The variable electrical transmission may include one or all of the elements described above: stator(s), rotor(s), coils, permanent magnets, position sensors, coil energizing circuits and/or rectification circuits and design considerations as previous enumerated.

Embodiment 3: Self-Contained Regenerative Hub Motor

Various embodiments of motors as disclosed herein may be utilized in automotive or powersports applications. A hub motor may be attached to the bolt studs that typically protrude through the brake rotor. The hub motor may rotate relative to the spindle, faster or slower, as needed. The torque from the motor may be generated as one or more rotors which contain an array of alternating north-south magnets are subjected to alternating push-pull forces generated in a stator composed of multiple flat coils.

In this embodiment, these elements are combined for the purpose of capturing energy in a regenerative or generator-based fashion from either a braking action or intentional generative action from higher relative spindle speeds to motor speeds and storing the captured energy in an internal storage device, which energy can subsequently be used to supplement or replace energy from the spindle for rapid and more efficient acceleration or cruising (within the limitations of the energy storage device).

In the self-contained embodiment, the motor controller electronics and some minimal energy storage may be contained inside the motor. Control signals may either be transferred by remote control or through the spindle.

In alternate embodiments, the motor may accept power and control signals through the spindle or through slip rings or discs or use a remote control device for communicating drive signals.

Optionally as needed for a specific application, the hub motor may include one or more locking devices which may prevent or limit the relative rotation of the hub motor which respect to the spindle. The locking device may take the form of an overriding slip clutch, a multiple disc clutch, or a solenoid/detent mechanism.

The ability of the hub motor to turn at speeds relative to the input spindle or shaft may allow the driven wheel to turn at relative speeds to the motor input shaft, allowing the hub motor to add power to the input shaft or take power from the input shaft. This allows the motor to act in a drive mode, a regeneration charging mode, or as in a controlled slip mode.

Embodiment 4: Hub Motor with Stationary Spindle

Embodiment 4 is similar to embodiment 3 except that in this embodiment the spindle or shaft is stationary. The hub motor rotor turns around the stationary shaft. This embodiment allows power and control signal wires to be passed through the spindle (including a hollow spindle, a solid spindle with multiple insulated electrical pathways, or a slot in the spindle). In this embodiment, the motor control electronics and/or power source may be located inside of the hub motor or outside of the hub motor.

Embodiment 5: Hub Motor with Internal Epicyclic Gear System

In this embodiment, the center area of the hub motor contains an epicycle gear system. The input spindle of the motor connects to the sun gear of the gear system. The motor rotors connect to the ring gear of the gear system. The planetary gear carrier connects to the rotating housing of the hub motor, which in turn drives the tire, roller, sprocket, outer gear teeth, etc.

Optionally, for some applications it may be appropriate to include a locking mechanism to lock the gear system so that the input shaft directly turns the wheel, sprocket, etc. The locking system may be composed of an overriding slip clutch, a disc clutch, a solenoid/detent mechanism, etc.

The presence of the epicyclic gear system allows the driven wheel to turn at relative speeds to the motor input shaft, allowing the hub motor to add power to the input shaft or take power from the input shaft. This allows the motor to act in a drive mode, a regeneration charging mode, or as in a controlled slip mode. As opposed to the first embodiment which does not have a gear system, the presence of the gear system in this embodiment allows a definite torque increase from the input shaft to the driven wheel, which may be especially useful in uphill or starting from rest situations.

Embodiment 6: Linear Motor

A linear motor embodiment may contain the following elements: a linear rotor containing a one or more linear arrays of magnets or coils, a linear stator containing one or more linear arrays of coils, a method of sensing coil relative to magnet position as described previously for driven coils (left out in a linear generator embodiment), a method of constraining or limiting the path of motion, which may include some form of linear bearing or bushing arrangement that allows the rotor and stator to move relative to each other in a predefined path, optionally, a travel limiting system (springs, hard stops, elastomeric bumpers, magnets, dampers, or combinations of these items), and optionally, a clutching or braking system.

Embodiment 6a: Linear Positioning Motor

A linear positioning motor embodiment is obtained when a linear motor as described in embodiment 6 is combined with an absolute or incremental position encoder of any type (optical, magnetic, etc.) and a closed-loop feedback system. The linear positioning motor does not experience magnetic pull from rotor to stator when the coils are not energized. This means that the motor does not have a tendency to snap into a position other than the last relative position of the stator(s) and rotor(s) where the motor last came to a rest (unless there are external forces). As such, if the closed loop feedback system detects any start of motion from the last rest position, it can energize the coils to reposition and hold the motor at the original position.

Embodiment 7: Pancake Motor

A pancake motor is defined to be a thin motor (or generator) where the motor diameter is larger than the motor thickness. A pancake motor embodiment of the regenerative motor and coil design may be similar to the standard motor design with the limitation of the diameter to width envelope dimensional proportions. Embodiments of the regenerative motor and coil design as disclosed herein may be particularly suited to pancake motor applications due to the thin stator/rotor sections.

Embodiment 8: Rotary Positioning Motor

A rotary positioning motor embodiment may be obtained when any of the rotary motor embodiments described herein are utilized with an absolute or incremental positioning sensor of any type (optical, magnetic, etc.) and combined with a closed-loop feedback system. The rotary positioning motor does not experience magnetic pull from rotor to stator when the coils are not energized. This means that the motor does not have a tendency to snap into a position other than the last relative position of the stator(s) and rotor(s) where the motor last came to a rest (unless there are external forces). As such, if the closed loop feedback system detects any start of motion from the last rest position, it can energize the coils to reposition and hold the motor at the original position.

Embodiment 9: Cup Motor

A cup motor embodiment can be designed using the radially aligned magnet/coil or coil/coil stator/rotor elements as described above or stator/rotor sections that use a hollow center section.

Embodiment 10: Magnetic Modules

The coils and cores described herein can exist in a variety of configurations. In one embodiment, the coils are encapsulated within another material whether within one or more thin sheets of material or fully encapsulated in a polymer or other encapsulating material. In the encapsulated embodiment, the encapsulated coil modules can optionally include electrical control system for energizing the coil based on a timing signal or count, or for rectifying generated power, or with both, and an energizing circuit and/or a rectifying circuit with circuit path switching if desired. In some embodiments, best performance is generated if energy is input into the coil for part of a duty cycle and then extracted from the coil during another part of the duty cycle. This is useful if a designer desires to input energy to create the field and then capture energy from the collapsing fields to increase efficiency, similar to the way that a compressed spring stores potential energy which can subsequently released.

Magnetic modules can exist with one or more coils in stand-alone units or as part of a larger assembly. Magnetic modules can be fractions of a stator or the entire stator. Magnetic modules can include coils or coils and electronics to control or derive power from coils.

Embodiment 11: Linear Propulsion Motor (Trains, Etc.)

The principles described in the linear motor can be readily extrapolated to a propulsion system for a variety of track-based electric vehicles. One embodiment uses alternating permanent magnets in a track and coils on a vehicle using the linear push-pull rotor/stator interactions described above. Another embodiment uses permanent magnets on the vehicle and coils in the tracks.

Embodiment 12: Projectile Device

The same concepts for the linear propulsion motor can be further extrapolated to launch vehicles or objects from a track as a projectile. Projectile based embodiments may utilize the coil design described herein in two-dimensional or three-dimensional coil arrays configured around a tube in one or more linear arrays around permanent magnet or induced magnetic projectiles.

Embodiment 13: Solenoid Devices

In a solenoid embodiment of the regenerative motor and coil design, the coils and magnets (possible one magnet and one coil) are configured to operate as a solenoid. The coil may be energized to move the magnet. The coil can be re-energized or de-energized (in the presence of gravity, a spring, compressed gas, or other return motion system) to return the solenoid to the initial position.

In all embodiments described above, optionally, coil energizing or power harvesting circuits can be included within the motors or be included separate from the motors and wired to the coils inside of the motor. It is frequently convenient to include the electronics within the center of a hub motor or integrated into the magnetic modules of a standard motor, transmission motor, or similar.

The embodiments described herein can also optionally be configured with the coil energizing circuits, coil energy harvesting circuits, part-time energizing/harvesting circuits, or on-demand energizing/harvesting switching circuits.

In various embodiments disclosed herein, a designer may choose to make the design modular or non-modular. In modular embodiments, one or more of the coils may be made as a self-contained module. A modular design facilitates assembly and maintenance such that if a coil module fails, it can be replaced with minimal disassembly of the motor—in some cases without even stopping the motor. In some embodiments an entire coil stator section may be formed as a module for easy replacement, though it might be advisable to allow the stator to at least be divisible into two sections to minimize disassembly. Embodiments of rotors as disclosed herein may also be divisible into discrete module sections.

Additional embodiments may be further embodied in various types of motors as further explained below.

Alternate Embodiment 1: Radial Flux Paths (Magnet-Coil Flux Path on Radials Rather than Axial Parallels)

This embodiment is similar to the cup motor without the hollow center section.

Alternate Embodiment 2: Multiple Concentric Arrays of Coils and Magnets

In applications where additional power to volume ratios are desired, stators and rotors can be configured as described in embodiments above but with one or more additional concentric arrays of magnets and coils in rotors and stators. Coils and magnets can be radially aligned or staggered from concentric array to concentric array.

Alternate Embodiment 3: Multiple Lines of Coils in Magnets for Linear Motor

This embodiment is similar to the alternate embodiment 2 for rotary motors, aligned or staggered linear arrays of magnets and coils can be used in linear rotors and stators for additional performance.

Alternate Embodiment 4: Multiple Concentric Arrays of Coils and Magnets II

This embodiment is similar to alternate embodiment 2, except that one or more of the stator/rotor sections may be configured in axial orientations and, within the same device, one or more stator/rotor sections may be configured in the radial orientation, possibly in an alternating configuration.

As various modifications could be made to the exemplary embodiments, as described above with reference to the corresponding illustrations, without departing from the scope of the present disclosure, it is intended that all matter contained in the foregoing description and shown in the accompanying drawings shall be interpreted as illustrative rather than limiting. Thus, the breadth and scope of the present disclosure should not be limited by any of the above-described exemplary embodiments, but should be defined only in accordance with the following claims appended hereto and their equivalents.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A motor comprising:
   a coil module including:
      a plurality of coils of conductive material, the plurality of coils arranged in a substantially common plane horizontally displaced from one another; and
      an electrical connector and a socket configured to receive one of a first plug-in module including a multiphase bridge rectifier or a second plug-in module wired to bypass internal conductors of the coil module, the coil module configured to output direct current through the electrical connector when operating as a generator with the first plug-in module plugged into the socket and to output alternating current through the electrical connector when operating as a generator with the second plug-in module plugged into the socket;

a support structure configured to accommodate the coil module and to accommodate at least one second coil module including a second plurality of coils of conductive material, the second plurality of coils arranged in the substantially common plane horizontally displaced from one another and from the plurality of coils of the first coil module;

an end rotor disposed at an outermost end of the motor on a first side of the coil module in a first plane parallel to the substantially common plane and including a first plurality of magnets; and a middle rotor including a second plurality of magnets and disposed on a second side of the coil module in a second plane parallel to the substantially common plane, the second side opposite the first side, each of the plurality of coils interacting with magnets in the first plurality of magnets and with magnets in the second plurality of magnets at the same time, the plurality of magnets in the end rotor including single pole faces having areas that are reduced as compared to an area of central portions of the magnets in the end rotor in planes parallel to planes defined by the pole faces, the plurality of magnets in the middle rotor including both top pole faces and bottom pole faces having areas that are reduced as compared to an area of central portions of the magnets in the middle rotor in planes parallel to planes defined by the pole faces.

2. The motor of claim 1, wherein the plurality of coils are retained in a material forming a portion of a body of the coil module.

3. The motor of claim 1, including one or more additional coil modules.

4. The motor of claim 3, wherein each of the coil modules is separately installable in the motor.

5. The motor of claim 3, wherein one or more of the coil modules includes one or more features configured to engage with corresponding one or more features on one or more other coil modules.

6. The motor of claim 3, wherein each of the coil modules is separately removable from the motor.

7. The motor of claim 3, wherein the coil module, the second coil module, and the one or more additional coil modules form a single stator assembly.

8. The motor of claim 3, wherein the motor is operable with at least one of the plurality of coils being deactivated or damaged.

9. The motor of claim 1, wherein the coil module is removable and replaceable from the motor.

10. The motor of claim 1, wherein the coil module is included in a stator of the motor.

11. The motor of claim 1, wherein the coil module is removable from the motor while the motor is in operation.

12. The motor of claim 1, wherein the coil module is installable in the motor while the motor is in operation.

13. The motor of claim 1, wherein the electrical connector is configured to output multi-phase alternating current through a plurality of electrical contacts and to output direct current through two of the plurality of electrical contacts.

14. The motor of claim 1, wherein the electrical connector is configured to output a signal from a thermal sensor disposed within the coil module.

15. The motor of claim 1, wherein the coil module is configured to induce motion of one of the end rotor and the middle rotor responsive to a supply of electrical current to the coil module.

16. The motor of claim 1, wherein the coil module is configured to produce an electrical current responsive to motion of one of the end rotor and the middle rotor.

17. The motor of claim 1, wherein the coil module is configured to produce multi-phase electrical current responsive to motion of one of the end rotor and the middle rotor.

18. The motor of claim 1, wherein the coil module includes plastic and a material that enhances thermal conductivity of the plastic.

19. The motor of claim 18, wherein one or more of the plurality of coils are retained in the plastic and the material that enhances thermal conductivity of the plastic.

20. The motor of claim 1, wherein the plurality of coils are disposed substantially parallel to each other.

21. The motor of claim 1, wherein the coil module includes a shell made of plastic.

22. The motor of claim 1, wherein the coil module includes a handle extending from an outer edge surface of the coil module.

23. The motor of claim 1, where the coil module includes one or more thermal sensors configured to provide a signal indicative of a temperature.

24. The motor of claim 23, where the coil module includes one or more indicators configured to provide a visual indication of the operation of one or more coils.

25. An electromagnetic motor comprising:
a modular coil assembly including:
a plurality of coils of conductive material, wherein each coil is arranged in a substantially common plane horizontally displaced from another coil and retained in the modular coil assembly; and
an electrical connector and a socket configured to receive one of a first plug-in module including a multiphase bridge rectifier or a second plug-in module wired to bypass internal conductors of the modular coil assembly, the modular coil assembly configured to output direct current through the electrical connector when operating as a generator with the first plug-in module plugged into the socket and to output alternating current through the electrical connector when operating as a generator with the second plug-in module plugged into the socket;
the modular coil assembly configured to cooperate with a plurality of additional modular coil assemblies substantially similar to the modular coil assembly to form a stator of the electromagnetic motor with coils of the plurality of additional modular coil assemblies disposed in the substantially common plane horizontally displaced from the coils of the modular coil assembly, each coil of the modular coil assembly configured to simultaneously interact with magnets of an end rotor disposed at an outermost end of the motor on a first side of the modular coil assembly in a plane parallel to the substantially common plane and with magnets of a middle rotor disposed between stators of the motor on a second side of the modular coil assembly in a second plane parallel to the substantially common plane, the first side being opposite to the second side, the magnets of the end rotor including single pole faces having areas that are reduced as compared to an area of central portions of the magnets in the end rotor in planes parallel to planes defined by the pole faces, the magnets of the middle rotor including both top pole faces and bottom pole faces having areas that are reduced as compared to an area of central portions of the magnets in the middle rotor in planes parallel to planes defined by the pole faces.

26. The motor of claim 25, wherein the modular coil assembly is configured to produce multi-phase alternating current responsive to movement of one of the end rotor and the middle rotor.

27. The motor of claim 25, configured to induce motion of one of the end rotor and the middle rotor responsive to a supply of electrical current to the modular coil assembly.

28. The motor of claim 25, configured to produce an electrical current responsive to motion of one of the end rotor and the middle rotor.

29. The motor of claim 25, wherein the plurality of coils include axes defined by axial extents of respective ones of the plurality of coils, the axes of the plurality of coils being disposed at angles with respect to each other.

30. The motor of claim 25, wherein the plurality of coils are disposed substantially parallel to each other.

31. The motor of claim 25, wherein the plurality of coils are retained in a matrix material, the matrix material including a first material, and one of a strengthening material or a material that enhances the thermal conductivity of the matrix material.

32. The motor of claim 25, wherein the plurality of coils are retained in a matrix material, the matrix material including a first material and a material that enhances the thermal conductivity of the matrix material.

33. The motor of claim 25, wherein one or more of the plurality of coils includes a core at least partially filled with a matrix material.

34. The motor of claim 25, wherein the modular coil assembly further includes a handle.

35. The motor of claim 25, wherein the modular coil assembly further includes a thermal sensor configured and arranged to provide a signal indicative of a temperature of a coil of the modular coil assembly.

36. The motor of claim 35, wherein the modular coil assembly includes at least one light emitting diode configured and arranged to provide information regarding a state of operation of at least one respective coil of the modular coil assembly.

37. The motor of claim 1, wherein pole faces of magnets in each of the rotors have widths less than or equal to widths of cores of the plurality of coils in the coil module.

* * * * *